US011688089B2

(12) United States Patent
Islam et al.

(10) Patent No.: US 11,688,089 B2
(45) Date of Patent: *Jun. 27, 2023

(54) METHOD AND PROCESSING SYSTEM FOR UPDATING A FIRST IMAGE GENERATED BY A FIRST CAMERA BASED ON A SECOND IMAGE GENERATED BY A SECOND CAMERA

(71) Applicant: MUJIN, INC., Tokyo (JP)

(72) Inventors: Russell Islam, Tokyo (JP); Xutao Ye, Tokyo (JP)

(73) Assignee: MUJIN, INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/360,073

(22) Filed: Jun. 28, 2021

(65) Prior Publication Data
US 2021/0327082 A1    Oct. 21, 2021

Related U.S. Application Data

(63) Continuation of application No. 16/668,492, filed on Oct. 30, 2019, now Pat. No. 11,080,876, which is a
(Continued)

(51) Int. Cl.
*G06T 7/55* (2017.01)
*G06T 7/70* (2017.01)
(Continued)

(52) U.S. Cl.
CPC ............. *G06T 7/55* (2017.01); *B25J 9/1697* (2013.01); *G06T 7/70* (2017.01); *H04N 5/247* (2013.01);
(Continued)

(58) Field of Classification Search
CPC .......... G06Q 30/0271; G06Q 30/0277; H04M 3/5166; H04M 3/5191; H04N 2013/0081;
(Continued)

(56) References Cited

U.S. PATENT DOCUMENTS 6,445,815 B1 * 9/2002 Sato .......................... G06T 7/73
382/154
9,596,445 B2 * 3/2017 Isogai ..................... G06T 15/205
(Continued)

FOREIGN PATENT DOCUMENTS

CN     104008569 A     8/2014
CN     105096300 A     11/2015
(Continued)

OTHER PUBLICATIONS

Office Action dated Aug. 14, 2020 in Chinese Patent Application No. 202010044657.3 (with English-translation).
(Continued)

*Primary Examiner* — Tung T Vo
(74) *Attorney, Agent, or Firm* — Medler Ferro Woodhouse & Mills

(57) ABSTRACT

A method and system for processing camera images is presented. The system receives a first depth map generated based on information sensed by a first type of depth-sensing camera, and receives a second depth map generated based on information sensed by a second type of depth-sensing camera. The first depth map includes a first set of pixels that indicate a first set of respective depth values. The second depth map includes a second set of pixels that indicate a second set of respective depth values. The system identifies a third set of pixels of the first depth map that correspond to the second set of pixels of the second depth map, identifies one or more empty pixels from the third set of pixels, and updates the first depth map by assigning to each empty pixel a respective depth value based on the second depth map.

20 Claims, 31 Drawing Sheets

Related U.S. Application Data continuation of application No. 16/438,084, filed on Jun. 11, 2019, now Pat. No. 10,510,155.

(51) Int. Cl.
  *H04N 5/247* (2006.01)
  *G06T 7/521* (2017.01)
  *B25J 9/16* (2006.01)

(52) U.S. Cl.
  CPC .... *G06T 7/521* (2017.01); *G06T 2207/10028* (2013.01)

(58) Field of Classification Search
  CPC ........... H04N 2013/0085; H04N 5/247; H04N 13/122; H04N 13/25; H04N 13/239; H04N 13/254; H04N 13/128; H04N 13/271; G06T 7/55; G06T 7/70; G06T 7/521; G06T 2207/10028; B25J 9/1697; G05B 2219/40564
  USPC .......................................................... 348/42
  See application file for complete search history.

(56) References Cited

U.S. PATENT DOCUMENTS

| | | | |
|---|---|---|---|
| 9,734,405 B2 | 8/2017 | Marty et al. | |
| 10,282,601 B2 | 5/2019 | Yang et al. | |
| 10,350,755 B2 | 7/2019 | Wagner et al. | |
| 10,460,208 B1* | 10/2019 | Atsmon | G06K 9/6262 |
| 2011/0115886 A1* | 5/2011 | Nguyen | H04N 13/271 |
| | | | 348/47 |
| 2012/0072021 A1 | 3/2012 | Walser et al. | |
| 2012/0098958 A1 | 4/2012 | Metzler et al. | |
| 2012/0120192 A1* | 5/2012 | Alregib | H04N 13/139 |
| | | | 348/43 |
| 2013/0329015 A1 | 12/2013 | Pulli et al. | |
| 2014/0002605 A1* | 1/2014 | Liao | G06T 5/005 |
| | | | 348/46 |
| 2014/0098100 A1* | 4/2014 | Dane | H04N 13/302 |
| | | | 345/427 |
| 2015/0049169 A1* | 2/2015 | Krig | H04N 13/211 |
| | | | 348/46 |
| 2015/0170371 A1* | 6/2015 | Muninder | H04N 13/128 |
| | | | 382/154 |
| 2015/0319421 A1* | 11/2015 | Chung | G06T 7/593 |
| | | | 348/46 |
| 2016/0188977 A1 | 6/2016 | Kearns et al. | |
| 2017/0186223 A1* | 6/2017 | Lerner | G06T 7/0002 |
| 2018/0101932 A1* | 4/2018 | Kwon | G06T 3/0068 |
| 2018/0139431 A1* | 5/2018 | Simek | H04N 13/254 |
| 2018/0189611 A1* | 7/2018 | Dal Mutto | G06T 7/90 |
| 2018/0322623 A1 | 11/2018 | Memo et al. | |
| 2019/0088004 A1 | 3/2019 | Lucas et al. | |
| 2019/0098233 A1 | 3/2019 | Gassend et al. | |
| 2019/0122378 A1* | 4/2019 | Aswin | G06N 3/0418 |
| 2019/0213779 A1* | 7/2019 | Sutton | G06T 7/11 |
| 2019/0287297 A1* | 9/2019 | Abhiram | G06T 7/246 |
| 2019/0373241 A1* | 12/2019 | Boyce | H04N 13/139 |
| 2019/0381670 A1* | 12/2019 | Correll | B25J 9/106 |

FOREIGN PATENT DOCUMENTS

| | | |
|---|---|---|
| CN | 106651925 A | 5/2017 |
| CN | 106780592 A | 5/2017 |
| CN | 107636534 A | 1/2018 |
| CN | 108369634 A | 8/2018 |
| JP | 2018-534699 A | 11/2018 |
| JP | 2019-501390 A | 1/2019 |

OTHER PUBLICATIONS

Frederic Garcia et al., "Pixel weighted average strategy for depth sensor data fusion," Conference Paper in Proceedings/ICIP (International Conference on Image Processing), Oct. 2010.

Hanqing Jiang et al., "Multi-View Depth Map Sampling for 3D Reconstruction of Natural Scene," Journal of Computer-Aided Design and Computer Graphics, Abstract Only, Oct. 31, 2015.

Foreign references and non-patent literature have been submitted in the parent application.

Chinese Office Action issued in corresponding Chinese Patent Application No. 201910751259.2 dated Sep. 13, 2022.

* cited by examiner

| 382 ↗ | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| 1 | 250 | 250 | 250 | 250 | 250 | 250 | 250 | 250 | 250 | 250 | 250 | 250 | 250 | 250 | 250 |
| 2 | 250 | 250 | 250 | 250 | 250 | 250 | 250 | 250 | 250 | 250 | 250 | 250 | 250 | 250 | 250 |
| 3 | 250 | 250 | 250 | 250 | 250 | 250 | 250 | 250 | 250 | 250 | 250 | 250 | 250 | 250 | 250 |
| 4 | 250 | 250 | 250 | 250 | 250 | 250 | 250 | 250 | 250 | 250 | 250 | 250 | 250 | 250 | 250 |
| 5 | 250 | 250 | 250 | 220 | 220 | 220 | 220 | 220 | 220 | 250 | 250 | 250 | 250 | 250 | 250 |
| 6 | 250 | 250 | 250 | 220 | 220 | 220 | 220 | 220 | 220 | 250 | 250 | 250 | 250 | 250 | 250 |
| 7 | 250 | 250 | 250 | 220 | 220 | 220 | 220 | 220 | 220 | 250 | 250 | 250 | 250 | 250 | 250 |
| 8 | 250 | 250 | 250 | 200 | 200 | 200 | 200 | 200 | 200 | 250 | 250 | 250 | 250 | 250 | 250 |
| 9 | 250 | 250 | 250 | 200 | 200 | 200 | 200 | 200 | 200 | 250 | 250 | 250 | 250 | 250 | 250 |
| 10 | 250 | 250 | 250 | 200 | 200 | 200 | 200 | 200 | 200 | 250 | 250 | 250 | 250 | 250 | 250 |
| 11 | 250 | 250 | 250 | 220 | 220 | 220 | 220 | 220 | 220 | 250 | 250 | 250 | 250 | 250 | 250 |
| 12 | 250 | 250 | 250 | 220 | 220 | 220 | 220 | 220 | 220 | 250 | 250 | 250 | 250 | 250 | 250 |

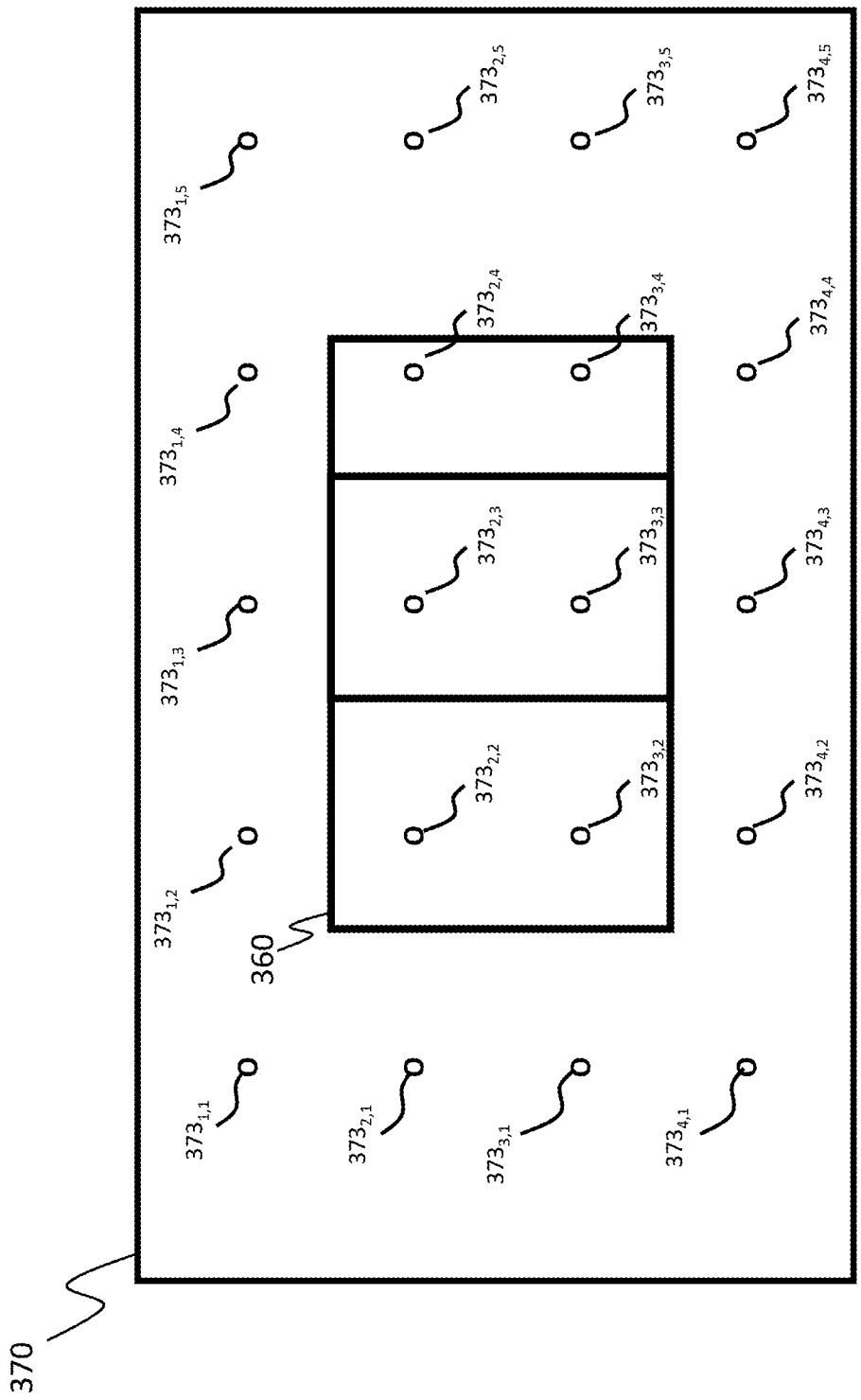

| | 1 | 2 | 3 | 4 | 5 | 6 | 7 | 8 | 9 | 10 | 11 | 12 |
|---|---|---|---|---|---|---|---|---|---|---|---|---|
| 15 | 250 | 250 | 250 | 250 | 250 | 250 | 250 | 250 | 250 | 250 | 250 | 250 |
| 14 | 250 | 250 | 250 | 250 | 250 | 250 | 250 | 250 | 250 | 250 | 250 | 250 |
| 13 | 250 | 250 | 250 | | 250 | | 250 | 250 | 250 | 250 | 250 | 250 |
| 12 | 250 | 250 | 250 | 220 | | | 220 | 220 | 250 | 250 | 250 | 250 |
| 11 | 250 | 250 | 250 | 220 | | | 220 | 220 | 250 | 250 | 250 | 250 |
| 10 | 250 | 250 | 250 | | | | 200 | 200 | 250 | 250 | 250 | 250 |
| 9 | 250 | 250 | | | | | 200 | 200 | 250 | 250 | 250 | 250 |
| 8 | 250 | 250 | 250 | | | | | 250 | 250 | 250 | 250 | 250 |
| 7 | 250 | 250 | 250 | 220 | | | | | | | | 250 |
| 6 | 250 | 250 | 250 | 220 | 220 | | | | | 250 | 250 | 250 |
| 5 | 250 | 250 | 250 | 220 | 220 | 220 | | | 250 | 250 | 250 | 250 |
| 4 | 250 | 250 | 250 | 250 | 250 | 250 | | | 250 | 250 | 250 | 250 |
| 3 | 250 | 250 | 250 | 250 | 250 | 250 | 250 | 250 | 250 | 250 | 250 | 250 |
| 2 | 250 | 250 | 250 | 250 | 250 | 250 | 250 | 250 | 250 | 250 | 250 | 250 |
| 1 | 250 | 250 | 250 | | 250 | 250 | 250 | | 250 | 250 | 250 | 250 |

682

| | | | |
|---|---|---|---|
| | | 250 | 250 |
| 250 | 220 | | 250 |
| | 200 | | 250 |
| 250 | 220 | | |
| 250 | 250 | 250 | 250 |

| | 1 | 2 | 3 | 4 | 5 | 6 | 7 | 8 | 9 | 10 | 11 | 12 |
|---|---|---|---|---|---|---|---|---|---|---|---|---|
| 15 | 250 | 250 | 250 | 250 | 250 | 250 | 250 | 250 | 250 | 250 | 250 | 250 |
| 14 | 250 | 250 | 250 | 250 | 250 | 250 | 250 | 250 | 250 | 250 | 250 | 250 |
| 13 | 250 | 250 | 250 | 250 | 250 | 220 | 250 | 250 | 250 | 250 | 250 | 250 |
| 12 | 250 | 250 | 250 | 220 | 220 | 220 | 220 | 220 | 250 | 250 | 250 | 250 |
| 11 | 250 | 250 | 250 | 220 | 210 | 210 | 210 | 220 | 250 | 250 | 250 | 250 |
| 10 | 250 | 250 | 250 | 210 | 210 | 210 | 210 | 200 | 200 | 250 | 250 | 250 |
| 9 | 250 | 250 | 200 | 200 | 200 | 200 | 200 | 200 | 250 | 250 | 250 | 250 |
| 8 | 250 | 250 | 250 | 200 | 200 | 210 | 210 | 220 | 250 | 250 | 250 | 250 |
| 7 | 250 | 250 | 250 | 220 | 200 | 210 | 210 | 220 | 220 | 220 | 250 | 250 |
| 6 | 250 | 250 | 250 | 220 | 220 | 220 | 220 | 220 | 220 | 220 | 250 | 250 |
| 5 | 250 | 250 | 220 | 220 | 220 | 235 | 235 | 235 | 250 | 250 | 250 | 250 |
| 4 | 250 | 250 | 250 | 250 | 250 | 250 | 235 | 235 | 250 | 250 | 250 | 250 |
| 3 | 250 | 250 | 250 | 250 | 250 | 250 | 250 | 250 | 250 | 250 | 250 | 250 |
| 2 | 250 | 250 | 250 | 250 | 250 | 250 | 250 | 250 | 250 | 250 | 250 | 250 |
| 1 | 250 | 250 | | 250 | 250 | 250 | 250 | 250 | 250 | 250 | 250 | 250 |

682

▨ Pixels considered to be adjacent to pixel [8, 3] and to pixel [8, 6]
▦ Pixels considered to be adjacent to pixel [8, 6] and to pixel [5, 9]
▨ Pixels considered to be adjacent to pixel [5, 9] and to pixel [5, 12]

METHOD AND PROCESSING SYSTEM FOR UPDATING A FIRST IMAGE GENERATED BY A FIRST CAMERA BASED ON A SECOND IMAGE GENERATED BY A SECOND CAMERA

FIELD OF THE INVENTION

The present invention is directed to a method and processing system for construction of an image based on camera image data.

BACKGROUND

Cameras may be used to facilitate automation applications in which a robot interacts with its environment, such as a warehousing or manufacturing environment. The cameras may generate images from which various information can be determined, such as a shape or size of an object in the robot's environment. The information may aid interactions in which the robot picks up the object in a warehouse or navigate around the object in a factory. The images captured by the camera may also be used to generate a model of the object, such as a three-dimensional (3D) model of the object.

SUMMARY

One aspect of the embodiments herein relates to a method performed by a camera image processing system. The method may be performed by a control circuit of the camera image processing system, such as by the control circuit executing instructions on a non-transitory computer-readable medium of the camera image processing system. The camera image processing system comprises a communication interface configured to communicate with: (i) a first camera that is a first type of depth-sensing camera and having a first camera field of view, and (ii) a second camera that is a second type of depth-sensing camera different from the first type of depth-sensing camera and having a second camera field of view which overlaps with the first camera field of view. The camera image processing system is configured, when the communication interface is in communication with the first camera and the second camera: to receive a first depth map that is generated based on information sensed by the first camera, wherein the first depth map includes a first set of pixels that represent a first set of respective physical locations in the first camera field of view and that indicate a first set of respective depth values for the first set of respective physical locations, wherein the first set of respective depth values are relative to the first camera. The camera image processing system is further configured to receive a second depth map that is generated based on information sensed by the second camera, wherein the second depth map includes a second set of pixels that represent a second set of respective physical locations in the second camera field of view and that indicate a second set of respective depth values for the second set of respective physical locations, wherein the second set of respective depth values are relative to the second camera. Additionally, the camera image processing system is configured to identify a third set of pixels of the first depth map that also represent the second set of respective physical locations, such that the third set of pixels correspond to the second set of pixels of the second depth map. Further, the camera image processing system is configured to identify one or more empty pixels from the third set of pixels, wherein each empty pixel of the one or more empty pixels is a pixel of the first depth map that has no depth value assigned to the pixel, and to update the first depth map by assigning to each empty pixel of the one or more empty pixels a respective depth value that is based on a depth value of a corresponding pixel of the second set of pixels of the second depth map, wherein the corresponding pixel for the empty pixel is a pixel of the second set of pixels of the second depth map that represents a same physical location as the empty pixel.

BRIEF DESCRIPTION OF THE DRAWINGS

The foregoing and other features, objects and advantages of the invention will be apparent from the following description of embodiments hereof as illustrated in the accompanying drawings. The accompanying drawings, which are incorporated herein and form a part of the specification, further serve to explain the principles of the invention and to enable a person skilled in the pertinent art to make and use the invention. The drawings are not to scale.

FIG. 3B depicts a first depth map, according to an embodiment herein.

FIG. 3H depicts a second set of physical locations represented by the second depth map, according to an embodiment herein.

FIGS. 6A through 6I illustrate examples in which a first depth map is updated based on depth information from a second depth map, according to embodiments herein.

FIGS. 7A through 7C illustrate examples in which a first depth map is updated based on depth information from a second depth map, according to embodiments herein.

FIGS. 8A and 8B illustrate examples in which a first depth map is updated based on depth information from a second depth map, according to embodiments herein.

DETAILED DESCRIPTION

Figure 1A:
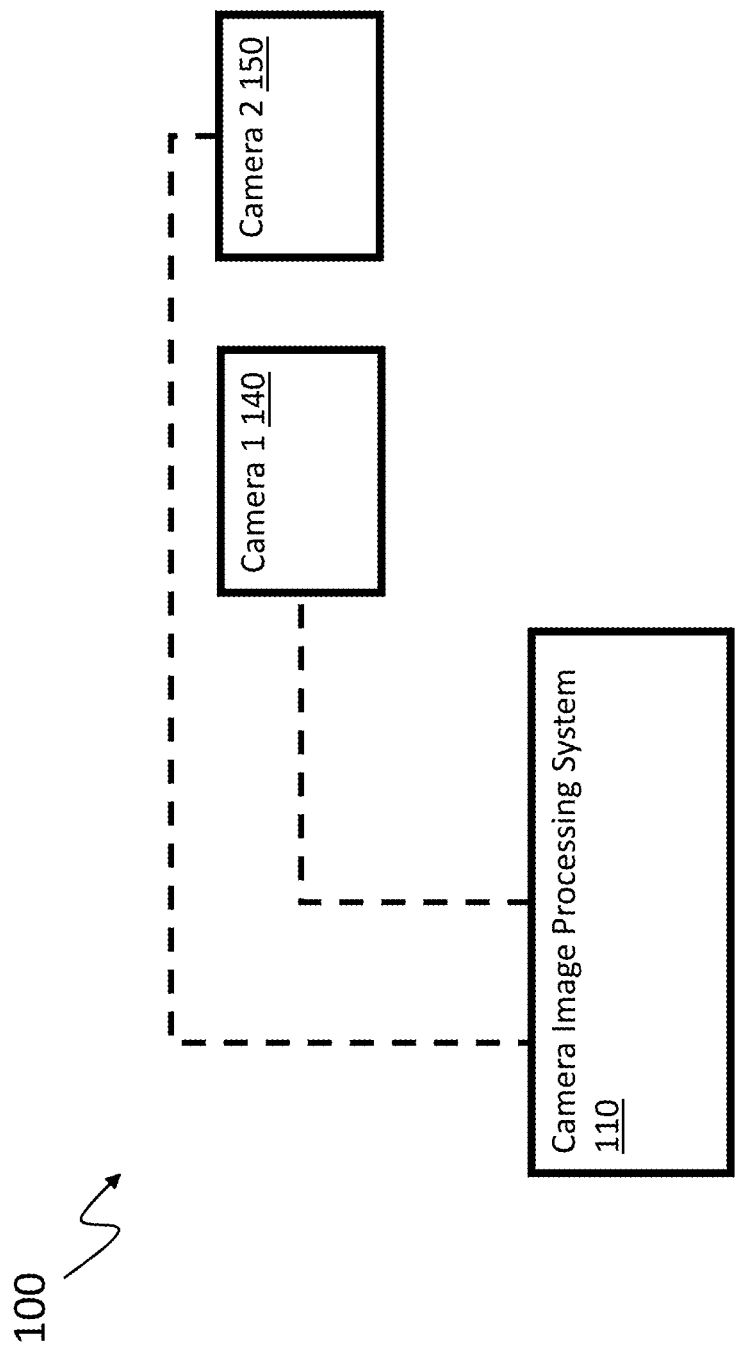
FIG. 1A depicts a block diagram of a vision system having a camera image processing system, a first camera, and a second camera, according to an embodiment herein.

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Embodiments described herein relate to supplementing or otherwise updating information in a first image based on information in a second image. More particularly, embodiments herein relate to supplementing or otherwise updating depth information (e.g., depth values) in a first depth map based on depth information in a second depth map. The first depth map may have been generated based on information sensed by a first camera, while the second depth map may have been generated based on information sensed by a second camera. In some cases, the second camera may have different properties than the first camera. For instance, the second camera may be a different type of camera than the first camera and may have a different principle of operation. The different properties may cause the second camera to, e.g., have less susceptibility to certain types of noise (also referred to as interference), better accuracy, higher resolution, or some other difference in property relative to the first camera. In some cases, information sensed by the second camera may cover certain physical locations that are missed by the first camera. This situation may arise because the two cameras have different susceptibilities to noise, different levels of accuracy, different resolutions, different fields of view, or because of some other reason. Because the second camera may sense information that was missed by or unavailable to the first camera, the second camera may be used to supplement a capability of the first camera and/or provide supplemental information that can yield a depth map or other image that is more complete and/or more accurate relative to an implementation that generates the depth map or other image using only one camera. The depth map of the embodiments herein may thus be a fusion of depth information obtained via the first camera and depth information obtained via the second camera.

In some instances, the updated depth map (also referred to as the supplemented depth map) may be used to enhance an ability of a robot to interact with its environment. For instance, depth information from the updated depth map may be used to generate a 3D model (e.g., a point cloud) of an object or structure in an environment of the robot. As mentioned above, the updated depth map in the embodiments herein may be more complete, or have a higher level of accuracy. As a result, a 3D model generated from the updated depth map may also be more complete and/or more accurate, which may facilitate more accurate control of the robot during its interaction with the object or structure that was modeled. For instance, more accurate 3D models of objects in a box or bin may enhance an ability of the robot to accurately perform bin picking, and more accurate 3D models of a structure in an environment of the robot may enhance an ability of the robot to avoid collision with the structure by navigating around the structure. Thus, embodiments herein may improve automation and facilitate more robust interactions between a robot and its environment.

In an embodiment, both the first depth map and the second depth map may include a plurality of pixels, and supplementing the first depth map (also referred to as updating the first depth map) may provide depth values to empty pixels of the first depth map. The empty pixels of the first depth map may be pixels that have no depth value assigned thereto, or that more generally are missing depth information. Thus, some embodiments herein relate to filling in missing depth information by assigning depth values to the empty pixels, thereby converting the empty pixels to updated pixels.

In an embodiment, the depth values assigned to the empty pixels may be based on depth values of corresponding pixels of the second depth map. In some cases, the empty pixels in the first depth map may be a result of interference that limits an ability of the first camera to sense information needed to determine depth values. For instance, if the first camera is a structured light camera, the source of interference may include sunlight, which may limit an ability of the first camera to sense structured light information, such as an appearance of a pattern projected onto a surface of an object. This limitation may in turn reduce an ability to determine depth values from the projected pattern. Thus, the interference may reduce the amount of reliable information which is needed to determine depth values, which may lead to a first depth map that has multiple empty pixels for which depth information is missing. In such an embodiment, depth values from the second camera may be used to fill in some of the missing depth information. In one example, the second camera may be a time-of-flight (ToF) camera, which may measure or otherwise sense time-of-flight information, from which depth values for a second depth map can be generated. Relative to a structured light camera, the TOF camera may be much less susceptible to the sunlight in terms of interference. Thus, the sunlight may have considerably less impact on an ability of the second camera to sense time-of-flight information, from which a second depth map having a second set of depth values can be generated. Thus, embodiments herein relate to mitigating an effect of interference or other source of error by using depth values from the second depth map to derive depth values which can update empty pixels of a first depth map.

In an embodiment, up-sampling may be performed as part of updating the first depth map, so as to enhance a quantity of empty pixels of the first depth map that are updated. In some cases, the up-sampling may be performed in a situation in which, e.g., the first depth map has a higher resolution than the second depth map. In such a situation, a pixel from the second depth map may be used to update multiple empty pixels of the first depth map. For instance, the pixel from the second depth map may be used to update a corresponding empty pixel in the first depth map as well as a set of adjacent empty pixels. If up-sampling is not performed, the number of empty pixels in the first depth map that are updated may be small relative to a total number of empty pixels or a total number of pixels of the first depth map in a scenario in which the resolution of the first depth map is much higher than the resolution of the second depth map. Thus, updating the empty pixels may have only a limited impact on the first depth map as a whole if the up-sampling is not performed. Accordingly, the up-sampling may be performed when updating empty pixels of the first depth map so as to have a greater impact on how much depth information is in the first depth map.

In an embodiment, down-sampling may be performed so as to update an empty pixel of the first depth map based on depth information from multiple pixels of the second depth map. In some cases, the down-sampling may be implemented in a situation in which the first depth map has lower resolution than the second depth map. In such a situation, multiple pixels from the second depth map may correspond to a common empty pixel of the first depth map. The empty pixel may be updated with a depth value that is an average or other composite value of the depth information of the corresponding multiple pixels of the second depth map.

In an embodiment, when a depth value is assigned to a pixel which is an empty pixel of the first depth map, a back-projection operation may be performed to find a physical location that projects to a center location of that pixel, and more specifically to find a 3D coordinate $[X'' \ Y'' \ Z'']^T$ (wherein T denotes a transpose) of the physical location, wherein the physical location may be a location on a surface of an object or structure. The 3D coordinate $[X'' \ Y'' \ Z'']^T$ may then be used as a point in a point cloud, which may act as a 3D model of an object or structure in the first camera's field of view. More specifically, physical locations on the object or structure may project to corresponding sensors (e.g., photodetectors) in a sensor array of the first camera, wherein each of the sensors occupies a corresponding physical region in the sensor array. In some cases, the sensors may correspond with pixels of a depth map, such that the physical locations on the object or structure may also be referred to as projecting onto the pixels. A physical location on an object or structure may be represented by a pixel because the physical location projects to a location within a physical region occupied by a sensor corresponding to that pixel. In this example, a center of the region may be referred to as a center of the pixel. When the pixel is assigned a depth value, the pixel may represent the physical location having a first 3D coordinate of $[X' \ Y' \ Z']^T$. This first 3D coordinate $[X' \ Y' \ Z']^T$ may be determined based on an intrinsic parameter of the second camera (e.g., a projection matrix of the second camera), a spatial relationship between the first camera and the second camera, and an intrinsic parameter of the first camera (e.g., a projection matrix of the first camera). In some cases, a Z component of the first 3D coordinate (i.e., Z') is equal to the depth value for the pixel representing the physical location (i.e., Z' is equal to the depth value assigned to the pixel). However, the physical location having the first 3D coordinate $[X' \ Y' \ Z']^T$ may not necessarily project to the center location of the pixel, and may instead project to some other location in the region associated with the pixel (or, more specifically, in the region occupied by the sensor corresponding to the pixel), such as a location in a periphery of the region. Using the first 3D coordinate $[X' \ Y' \ Z']^T$ as a point in a point cloud of the object or structure may be undesirable in some circumstances because some processes that use the point cloud may rely on an assumption that each 3D coordinate in the point cloud projects onto a center location of a corresponding pixel. If the point cloud deviates from that assumption, the processes that rely on that assumption may fail to operate properly. Thus, the point cloud may need to instead include a second 3D coordinate $[X'' \ Y'' \ Z'']^T$ of another physical location that does project to the center location of the corresponding pixel. In an embodiment, the second 3D coordinate may be determined via a back-projection operation. The back-projection operation may determine an imaginary line that connects a focal point of the first camera and the center location of the pixel, and determine the second 3D coordinate as a coordinate that falls on the imaginary line. This imaginary line may approximate all physical locations in the first camera's field of view that can project onto the pixel. In some cases, the Z-component of the second 3D coordinate may have to be equal to the depth value of the pixel (i.e., Z" and Z' are equal to the depth value). In such cases, the back-projection operation may involve determining an X component (i.e., X") and Y component (i.e., Y") of the second 3D coordinate to satisfy the conditions of the 3D coordinate having to fall on the imaginary line and the Z-component of the second 3D coordinate having to be equal to the depth value of the pixel. The second 3D coordinate may be included in a point cloud of the object or structure in lieu of the first 3D coordinate.

FIG. 1A illustrates a block diagram of a vision system 100 (also referred to as an image acquisition system 100, a model construction system 100, or more simply as the system 100) that includes a camera image processing system 110, a first camera 140, and a second camera 150. The vision system 100 may be configured to generate an image of an object or structure in a field of view of a first camera 140 and/or a field of view of a second camera 150. In an embodiment, the image may be a color image or grayscale image that includes color intensity information or grayscale information for the object or structure. In an embodiment, the image may be a depth map that includes depth information (also referred to as range information) for the object or structure. For instance, the depth map may include a plurality of pixels, wherein some or all of the pixels are assigned respective depth values. In some cases, the pixels may further be assigned with values that are 3D coordinates for respective physical locations on a surface of an object or structure. For instance, some or all of the pixels may each be assigned a first value, a second value, and a third value that are a X component, a Y component, and a Z component, respectively, of a 3D coordinate of a respective physical location of an object in a field of view of the first camera 140 and in a field of view of the second camera 150. The depth values may in some scenarios be a component of the 3D coordinates. For instance, the depth values may be Z-components of the 3D coordinates. If the pixels are assigned 3D coordinates for respective physical locations on a surface of an object or structure, the depth map may also be a point cloud or part of a point cloud, which may be considered a 3D model or partial 3D model of the object or structure. In some situations, any other type of depth map may also be considered a 3D model or partial 3D model of an object or structure. In an embodiment, the vision system 100 may be configured to generate a point cloud of the object or structure based on depth information sensed by the first camera 140 and/or the second camera 150.

In an embodiment, the vision system 100 may be deployed or otherwise located within a warehouse, a manufacturing plant, or other premises, and may facilitate robot operation at the premises. In some cases, the vision system 100 may be configured to generate a 3D model of an object or type of object with which a robot at the premises is to interact. For instance, FIG. 1E depicts an embodiment in which the vision system 100 is in communication with a robot control system 170 (which may also be referred to as a robot controller), wherein the robot control system 170 is configured to generate robot movement commands for a robot 180. In the example of FIG. 1E, the vision system 100, robot control system 170, and the robot 180 may all be deployed within a warehouse or other premises. The robot 180 may be intended to interact specifically with an object 190 in the warehouse, or with objects having a same shape and/or size as the object 190. For instance, the object 190 may be merchandise or package in the warehouse, and the robot interaction may involve bin picking, de-palletizing, palletizing, or some other robot operation. In this example, the vision system 100 may be configured to generate a 3D model of the object 190 based on depth information acquired by the vision system 100, and may be configured to communicate the 3D model to the robot control system 170. The 3D model may indicate, e.g., a size, shape, location, and/or orientation of the object 190. In some instances, the robot control system 170 may be configured to generate a robot movement command based on the 3D model and based on a desired interaction between the robot 180 and the object 190. The robot control system 170 may be configured to communicate the robot movement command to the robot 180 to cause the robot 180 to interact with the object 190 in a desired manner. In the embodiment of FIG. 1E, the vision system 100 and the robot control system 170 may be separate systems. In another embodiment, the vision system 100 may be part of the robot control system 170.

Returning to FIG. 1A, the camera image processing system 110 (also referred to as a camera information processing system 110) may be configured to communicate with the first camera 140 and the second camera 150 (e.g. both of FIG. 1A), and to receive information from the first camera 140 and the second camera 150. In an embodiment, the information may be a depth map. In an embodiment, the information may be structured light information, time-of-flight information, or other information from which a depth map can be generated. The information received from the camera may be considered imaging information, and the camera image processing system 110 may be configured to process the imaging information so as to supplement imaging information acquired from the first camera 140 with imaging information acquired from the second camera 150. In some instances, the camera image processing system 110 may be configured to process a first depth map, which may be generated based on information sensed by the first camera 140, so as to supplement the first depth map with depth information from a second depth map, which may be generated based on information sensed by the second camera 150. In an embodiment, the first depth map may represent an object in a field of view of the first camera 140 and the second camera 150, and the camera image processing system 110 may be configured to generate a 3D model (e.g., a point cloud) of the object based on depth information in the first depth map after the first depth map has been supplemented with depth information from the second depth map.

In an embodiment, the camera image processing system 110 may be a single device (e.g., a single console or a single computer) that is configured to communicate with the first camera 140 and the second camera 150. In some cases, the camera image processing system 110 may include multiple devices, such as multiple computers or multiple consoles that are in communication with each other. In some cases, the camera image processing system 110 may be dedicated to processing information received from the first camera 140 and the second camera 150, to determining depth information of an environment (also referred to as a target scene) in a field of view of the camera 140/150, and/or to generating a 3D model of objects or structures in the environment. In an embodiment, the camera image processing system 110 may also be configured to perform functionality associated with the robot control system 170 of FIG. 1E, such as the functionality of generating robot movement commands (e.g., motor commands) based on the 3D model generated by the system 110.

In an embodiment, the camera image processing system 110 may be configured to receive, from the first camera 140 and the second camera 150, information sensed by the camera 140/150. The information may be structured light information, time-of-flight information, a depth map, as discussed above, or some other information (e.g., a color image or grayscale image). In an embodiment, the camera image processing system 110 may be configured to send one or more commands to the first camera 140 and the second camera 150. For instance, the one or more commands may each be a camera command that causes the first camera 140 and/or the second camera 150 to generate a depth map, or more generally to sense information from which a depth map or other type of image can be generated. In some cases, the camera command may cause the first camera 140 and/or the second camera 150 to transmit information sensed by the respective camera to the camera image processing system 110. The camera image processing system 110 may be configured to communicate with the first camera 140 and the second camera 150 via a communication interface 113, which is discussed below in more detail with respect to FIG. 1B.

In an embodiment, the only cameras in the vision system 100 of FIG. 1A may be the first camera 140 and the second camera 150, and the camera image processing system 110 may be configured to generate an updated depth map and/or generate a 3D model of an object based on only information sensed by the first depth map and information sensed by the second camera 150. In another embodiment, the vision system 100 may include one or more cameras in addition to the first camera 140 and the second camera 150, and may be configured to generate an updated depth map and/or generate a 3D model of an object based also on information sensed by the one or more additional cameras.

Figure 1B:
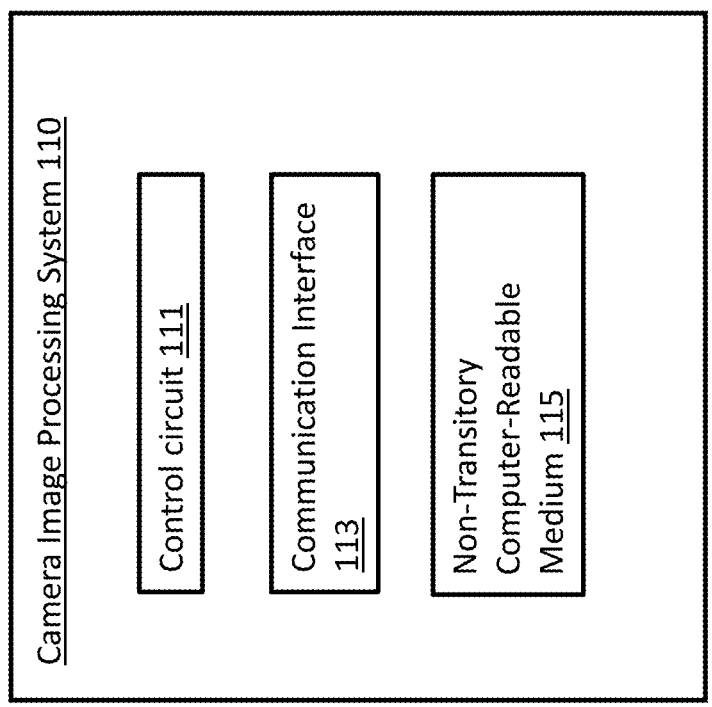
FIG. 1B depicts a block diagram of a camera image processing system, according to an embodiment herein.

FIG. 1B depicts a block diagram of the camera image processing system 110, which may also be referred to as a vision controller. As illustrated in the block diagram, the camera image processing system 110 includes a control circuit 111, a communication interface 113, and a non-transitory computer-readable medium 115 (e.g., memory). In an embodiment, the control circuit 111 may include one or more processors, a programmable logic circuit (PLC) or a programmable logic array (PLA), a field programmable gate array (FPGA), an application specific integrated circuit (ASIC), or any other control circuit.

In an embodiment, the communication interface 113 may include one or more circuits or other components that are configured to communicate with the first camera 140 and the second camera 150 of FIG. 1A. For instance, the communication interface 113 may include a communication circuit configured to perform communication over a wired or wireless protocol. As an example, the communication circuit may include a RS-232 port controller, a USB controller, an Ethernet controller, a Bluetooth® controller, a PCI bus controller, any other communication circuit, or a combination thereof. The communication interface 113 may enable the camera image processing system 110, and more specifically the control circuit 111, to communicate with the first camera 140 and the second camera 150 via a RS-232 interface, a universal serial bus (USB) interface, an Ethernet interface, a Bluetooth® interface, an IEEE 802.11 interface, or any combination thereof. In an embodiment, the communication interface 113 may be part of a local computer bus, such as a peripheral component interconnect (PCI) bus.

In an embodiment, the non-transitory computer-readable medium 115 may include computer memory. The computer memory may comprise, e.g., dynamic random access memory (DRAM), solid state integrated memory, and/or a hard disk drive (HDD). In some cases, the non-transitory computer-readable medium 115 may store computer-executable instructions, such as instructions to perform the method of FIG. 4. In some cases, the non-transitory computer-readable medium 115 may store information from the first camera 140 and/or second camera 150, such as structured light information, time-of-flight information, a depth map, and/or a point cloud.

Figure 1D:
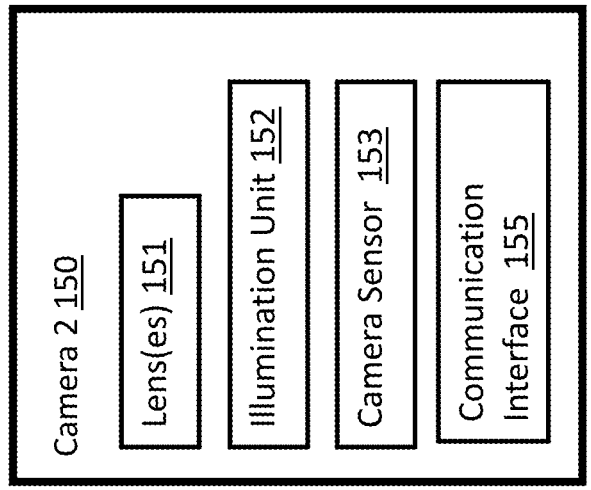
FIG. 1D depicts a block diagram of a second camera, according to an embodiment herein.
Figure 1C:
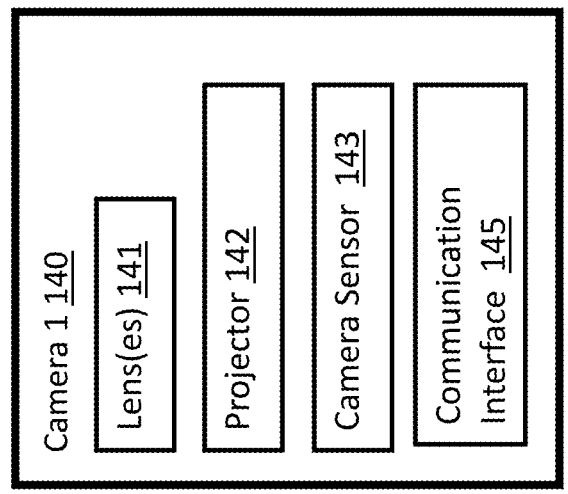
FIG. 1C depicts a block diagram of a first camera, according to an embodiment herein.
Figure 1E:
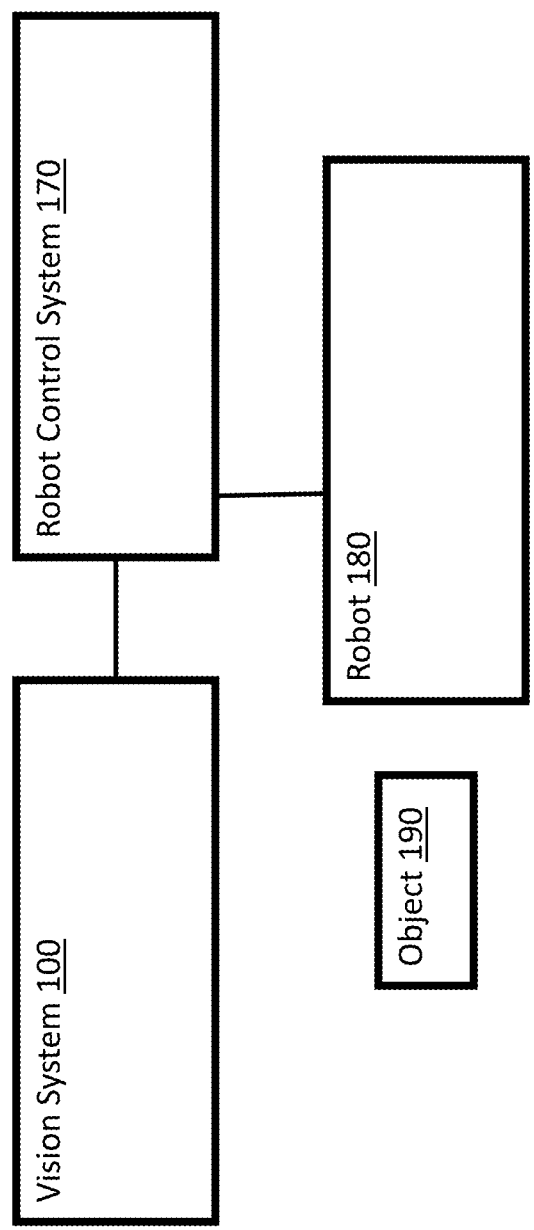
FIG. 1E depicts a block diagram of a vision system in communication with a robot control system, according to an embodiment herein.

FIGS. 1C and 1D provide block diagrams of the first camera 140 (labeled as "Camera 1") and the second camera 150 (labeled as "Camera 2"), respectively. In the embodiments herein, a camera may include a sensor system (e.g., 2D sensor array) that is configured to sense information that describes an appearance of a target scene in the camera's field of view, a three-dimensional structure of an object or structure in the target scene, and/or some other information about the target scene. The camera may be a depth-sensing camera (also referred to as a range-sensing camera), a color-sensing camera, an infrared camera, and/or any other type of camera. In some cases, the camera may be configured to generate an image that describes the appearance, three-dimensional structure, or other information about the target scene. The image may be a depth map, a color image, a grayscale image, or any other type of image, and may include a plurality of pixels (e.g., a two-dimensional (2D) array of pixels). In some cases, the camera may have an array of sensors (e.g., photodetectors), and the image may have an array of pixels that have a one-to-one correspondence with the array of sensors.

In an embodiment, the first camera 140 and the second camera 150 may be different types of cameras. For instance, the first camera 140 may be a first type of depth-sensing camera (e.g., a structured light camera), while the second camera 150 may be a second type of depth-sensing camera (e.g., a time-of-flight (TOF) camera). The depth-sensing cameras may also be referred to as range-sensing cameras. In some cases, the first camera 140 and the second camera 150 may have different principles of operation or implementation. In some cases, the first camera 140 may have certain limitations in terms of accuracy, spatial resolution (also referred to simply as resolution), or susceptibility to noise or interference, and the second camera 150 may have better performance in one or more of those categories. Thus, information from the second camera 150 may be used to supplement information acquired by the first camera 140 so as to improve a robustness of the information acquired by the first camera 140.

FIG. 1C depicts a block diagram of an embodiment in which the first camera 140 is a structured light camera. In this embodiment, the first camera 140 may include one or more lenses 141, a projector 142, a camera sensor 143, and a communication interface 145. In an embodiment, the communication interface 145 may be configured to communicate with the camera image processing system 110 of FIG. 1A or 1B, and may be similar to the communication interface 113 of FIG. 1B of the camera image processing system 110.

In an embodiment, the projector 142 may be configured to project a pattern, such as a series of stripes in the infrared or visible light spectrum, away from the first camera 140 and onto one or more surfaces of an object or structure in a target scene within the first camera 140's field of view. The projected pattern may reflect off the one or more surfaces back toward the first camera 140. The reflected visible light or infrared radiation may be focused by one or more lenses 141 onto a camera sensor 143. In an embodiment, the camera sensor 143 may include a charge-coupled device (CCD) or other sensor array. The first camera 140 may be configured to sense structured light information using the camera sensor 143, wherein the structured light information may refer to an appearance of the projected pattern on the one or more surfaces in the target scene. In some cases, the structured light information may have the form of a color image that describes the appearance of the series of stripes or other pattern on the one or more surfaces. In an embodiment, the first camera 140 may be configured to generate a depth map based on the structured light information, and to communicate the depth map and/or the structured light information to the camera image processing system 110 via the communication interface 145. In such an embodiment, the first camera 140 may include its own processor or other control circuit that is configured to generate the depth map. In an embodiment, the first camera 140 may rely on the camera image processing system 110 to generate the depth map, and may be configured to communicate the structured light information to the camera image processing system 110 so that the system 110 can generate the depth map based on the structured light information. In some cases, such as when the first camera 140 is a structured light camera, the vision system 100 may be located in an environment in which a lighting condition can be controlled. For instance, the environment may be an enclosed space that is able to block out sunlight, which may act as a source of interference which interferes with an ability of the first camera 140 to sense structured light information.

FIG. 1D depicts a block diagram of an embodiment in which the second camera 150 is a TOF camera. In such an embodiment, the second camera 150 includes one or more lenses 151, an illumination unit 152, a camera sensor 153, and a communication interface 155. The communication interface 155 may be configured to communicate with the camera image processing system 110 of FIG. 1, and may be similar to the communication interface of the camera image processing system 110 of FIG. 1B.

In an embodiment, the illumination unit 152 may be configured to emit visible light or any other form of light away from the second camera 150 and toward a target scene in the second camera 150's field of view. The illumination unit 152 may include, e.g., a laser, a light emitting diode (LED), or any other light source. The emitted light may have the form of a pulse, a continuous wave modulated by a carrier wave, or some other form of emitted light. In some cases, the emitted light may be emitted as a beam toward a narrow region in the target scene, or may be spread out over a wide region in the target scene. The emitted light may reflect off one or more surfaces in the target scene, and may become reflected light that travels back toward the second camera 150. In an embodiment, the one or more lenses 151 may focus the reflected light onto the camera sensor 153.

In an embodiment, the camera sensor 153 may include a sensor array having an array of photodetectors (e.g., avalanche photo diodes) that are configured to detect the reflected light. In some implementations, the camera sensor 153 may further include a timing circuit that is configured to determine when the reflected light is detected by each photodetector of the sensor array. For instance, the timing circuit may include respective counters (or, more generally, timing registers) corresponding to the plurality of photodetectors, each of which may start incrementing when the illumination unit 152 emits the light toward a scene, and stop counting when a corresponding photodetector detects the reflected light. In one implementation, the timing circuit may be omitted.

In an embodiment, the second camera 150 may be configured to use the camera sensor 153 to sense time-of-flight information. The time-of-flight may refer to an amount of time between the illumination unit 152 emitting light toward a target scene and a reflection of the emitted light (i.e., the reflected light) being detected by a photodetector of the camera sensor 153. The time-of-flight information may be determined based on, e.g., timing information captured by a timing circuit, or based on a difference between a phase of the light emitted by the illumination unit 152 and a phase of the reflected light detected by the camera sensor 153. In an embodiment, the second camera 150 may be configured to generate a depth map based on the time-of-flight information, and to communicate the depth map and/or the time-of-flight information to the camera image processing system 110 via the communication interface 155. In an embodiment, the second camera 150 may rely on the camera image processing system 110 to generate the depth map, and may communicate the time-of-flight information to the camera image processing system 110, which may be configured to generate a depth map based on the time-of-flight information.

In an embodiment, depth values in a depth map may be relative to a location of the camera sensor 143/153, relative to the one or more lenses 141/151, or relative to some other location in the cameras 140/150. For instance, the depth values in a first depth map associated with the first camera may be relative to a first image plane, wherein the first image plane is a plane defined by a sensor array or other component of the camera sensor 143. Thus, depth values in the first depth map may be measured relative to, e.g., the first image plane. Similarly, the depth values in a second depth map associated with the second camera may be relative to, e.g., a second image plane, wherein the second image plane is a plane defined by a sensor array or other component of the camera sensor 153.

In an embodiment, the first camera 140 and the second camera 150 may have different resolutions. For instance, the camera sensor 143 of the first camera 140 and the camera sensor 153 of the second camera 150 may have different resolutions. Such a situation may lead to a first depth map and a second depth map having different resolutions, wherein the first depth map is generated by or based on information sensed by the first camera 140, and the second depth map is generated by or based on information sensed by the second camera 150. The resolution may refer to, e.g., how many pixels or how many pixels per unit area are used to represent a target scene. In another embodiment, the first camera 140 and the second camera 150 may have the same resolution, which may lead to the first depth map and the second depth map having the same resolution.

Figure 2:
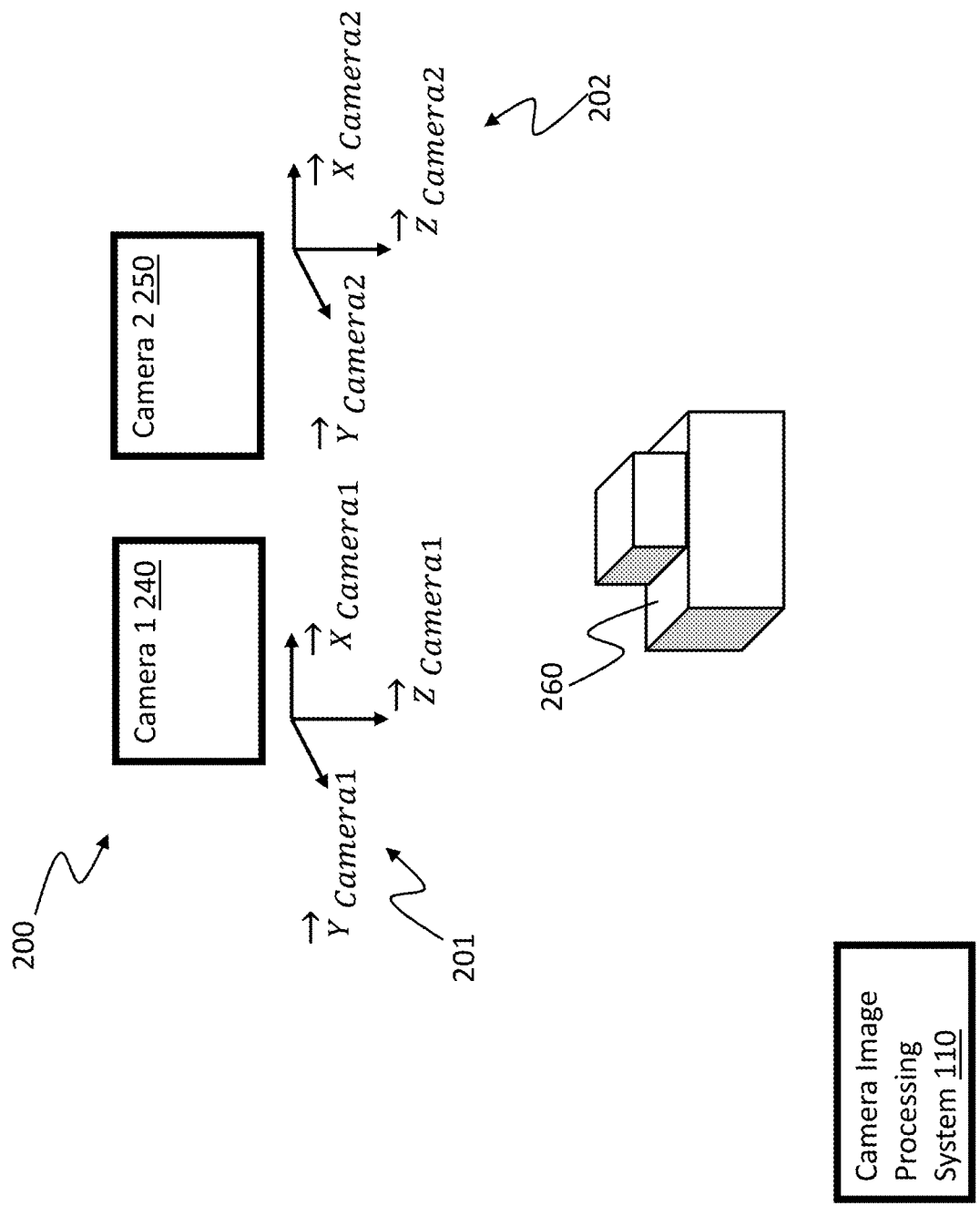
FIG. 2 depicts a vision system in which a first camera and a second camera sense information from which depth maps can be generated, according to an embodiment herein.

FIG. 2 depicts a vision system 200 (also referred to as an object model construction system 200, or more simply as the system 200) that includes a first camera 240 (labeled "Camera 1") that is a first type of depth-sensing camera and includes a second camera 250 (labeled "Camera 2") that is a second type of depth-sensing camera different than the first type of depth-sensing camera, and includes the camera image processing system 110 of FIGS. 1A and 1B. In an embodiment, information from both the first camera 240 and the second camera 250 may be used to generate a depth map of an object 260. The depth map may be considered a 3D model of the object 260. In some instances, the depth map may also be a point cloud, or may have depth information that is used to generate a point cloud, which may also be a 3D model of the object 260. As discussed above, the depth map may include depth information that describe respective depth values of physical locations on a surface of the object 260, and the point cloud may include information identifying 3D coordinates of physical locations on the surface of the object 260. The system 200 may be an embodiment of system 100 of FIG. 1A, the first camera 240 may be an embodiment of the first camera 140 of FIG. 1A or 1C, and the second camera 250 may be an embodiment of the second camera 150 of FIG. 1A or 1D.

In an embodiment, the first camera 240 may be configured to generate a first depth map that indicates respective depth values (also referred to as respective depths) of a first set of physical locations (also referred to as a first set of points) on a surface of the object 260, wherein the depth values are relative to the first camera 240 (e.g., relative to an image plane of the first camera 240). In an embodiment, the second camera 250 may be configured to generate a second depth map that indicates respective depth values of a second set of physical locations on the surface of the object 260 relative to the second camera 250.

FIG. 2 further depict coordinate axes 201 of a coordinate system of the first camera 240 and coordinate axes 202 of a coordinate system of the second camera 250. Both the coordinate system of the first camera 240 and the coordinate system of the second camera 250 may be defined by X, Y, and Z axes, as depicted in FIG. 2. The X and Y axes of each coordinate system may define a plane that is parallel with a respective image plane of the first camera 240 or second camera 250, while the Z axis of the coordinate system may be perpendicular to the respective image plane. In an embodiment, an origin of the coordinate system of the first camera 240 may be located at, e.g., a center of an image plane of the first camera 240 or some other location, and an origin of the coordinate system of the second camera 250 may be located at, e.g., a center of an image plane of the second camera 250 or some other location. The depth values of the first depth map may be measured or expressed with respect to the coordinate system of the first camera 240, while the depth values of the second depth map may be measured or expressed with respect to the coordinate system of the second camera 250.

In some cases, the depth values in the first depth map may refer to distances along a coordinate axis (e.g., Z axis) of a coordinate system of the first camera 240, between the first set of physical locations on the surface of the object 260 and the first camera 240 (e.g., the image plane of the first camera 240). In such cases, the depth values in the first depth map may be Z components (also referred to as Z coordinates) of respective 3D coordinates of the first set of physical locations. In some cases, the depth values in the second depth map may refer to distances along a coordinate axis (e.g., Z axis) of a coordinate system of the second camera 250, between the second set of physical locations on the surface of the object 260 and the second camera 250 (e.g., the image plane of the second camera 250). In such cases, the depth values in the second depth map may be Z components of respective 3D coordinates of the second set of physical locations.

Figure 3A:
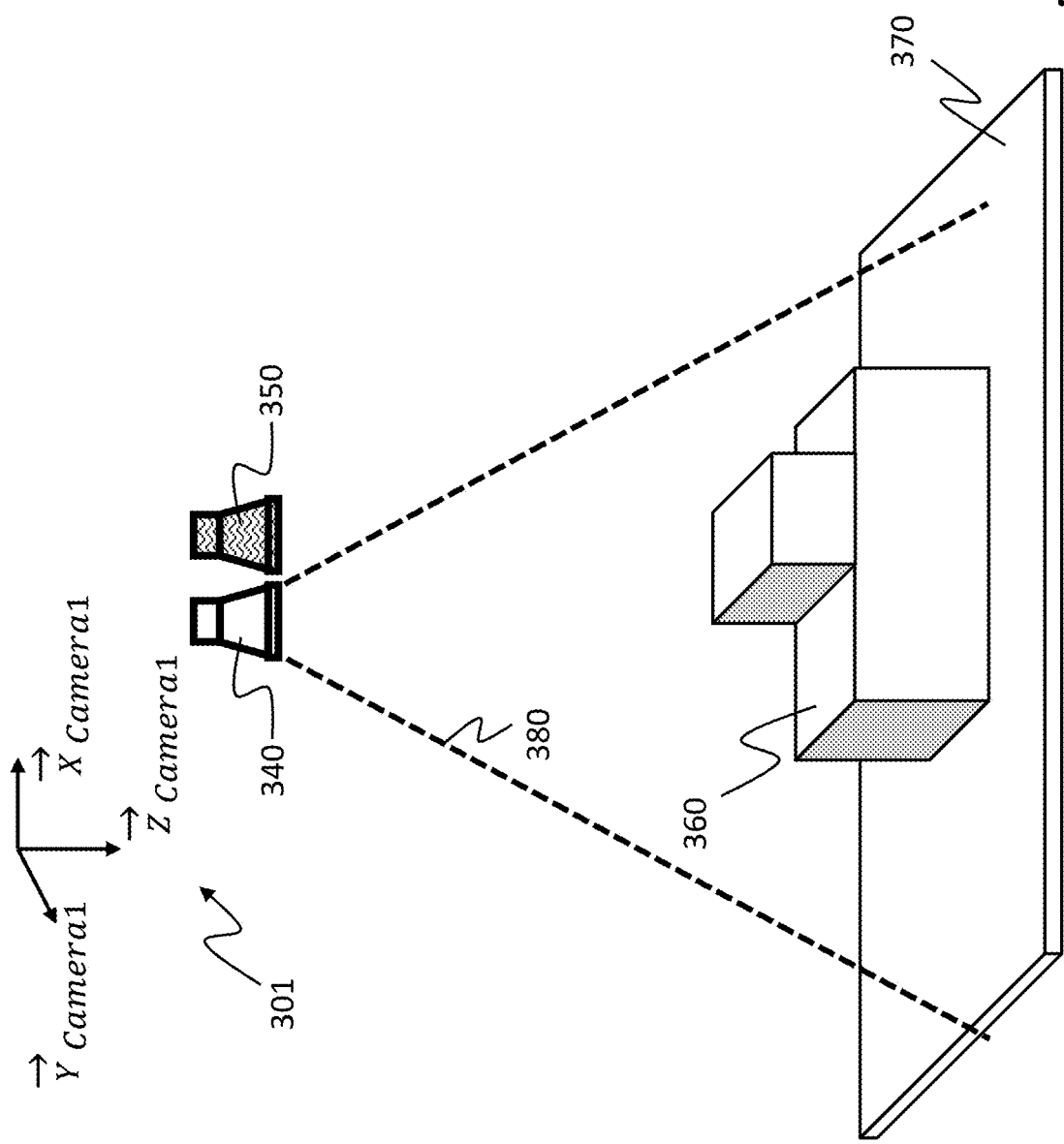
FIG. 3A depicts a vision system in which a first camera and a second camera sense information from which depth maps can be generated, according to an embodiment herein.

FIGS. 3A-3H are example diagrams that illustrate two respective depth maps generated using two different cameras. More specifically, FIG. 3A depicts a first camera 340 that is a first type of depth-sensing camera, and depicts a second camera 350 that is a second type of depth-sensing camera. The first camera 340 may be an embodiment of the camera 240 of FIG. 2, while the second camera 350 may be an embodiment of the camera 250 of FIG. 2. As illustrated in FIG. 3A, the first camera 340 has a field of view 380 (also referred to as a camera field of view 380). The first camera may be configured to sense information to generate a depth map for one or more surfaces an object 360 and a platform 370 in the camera field of view 380. The second camera 350 may be disposed within proximity of the first camera 340, and may have a field of view that overlaps with the field of view 380 of the first camera 340. The second camera 350 is discussed in more detail below with respect to FIG. 3E. In an embodiment, the first camera 340 and the second camera 350 may be directly or indirectly attached to each other in a manner that causes the first camera 340 and the second camera 350 to remain stationary relative to each other. FIG. 3A further illustrates coordinate axes 301 of a coordinate system of the first camera 340. In an embodiment, the coordinate system of the first camera 340 may have an origin that is on an image plane of the first camera 340. The coordinate system of the first camera 340 may provide a reference for depth values of a first depth map 382, which is discussed below in FIG. 3B.

Figure 3C:
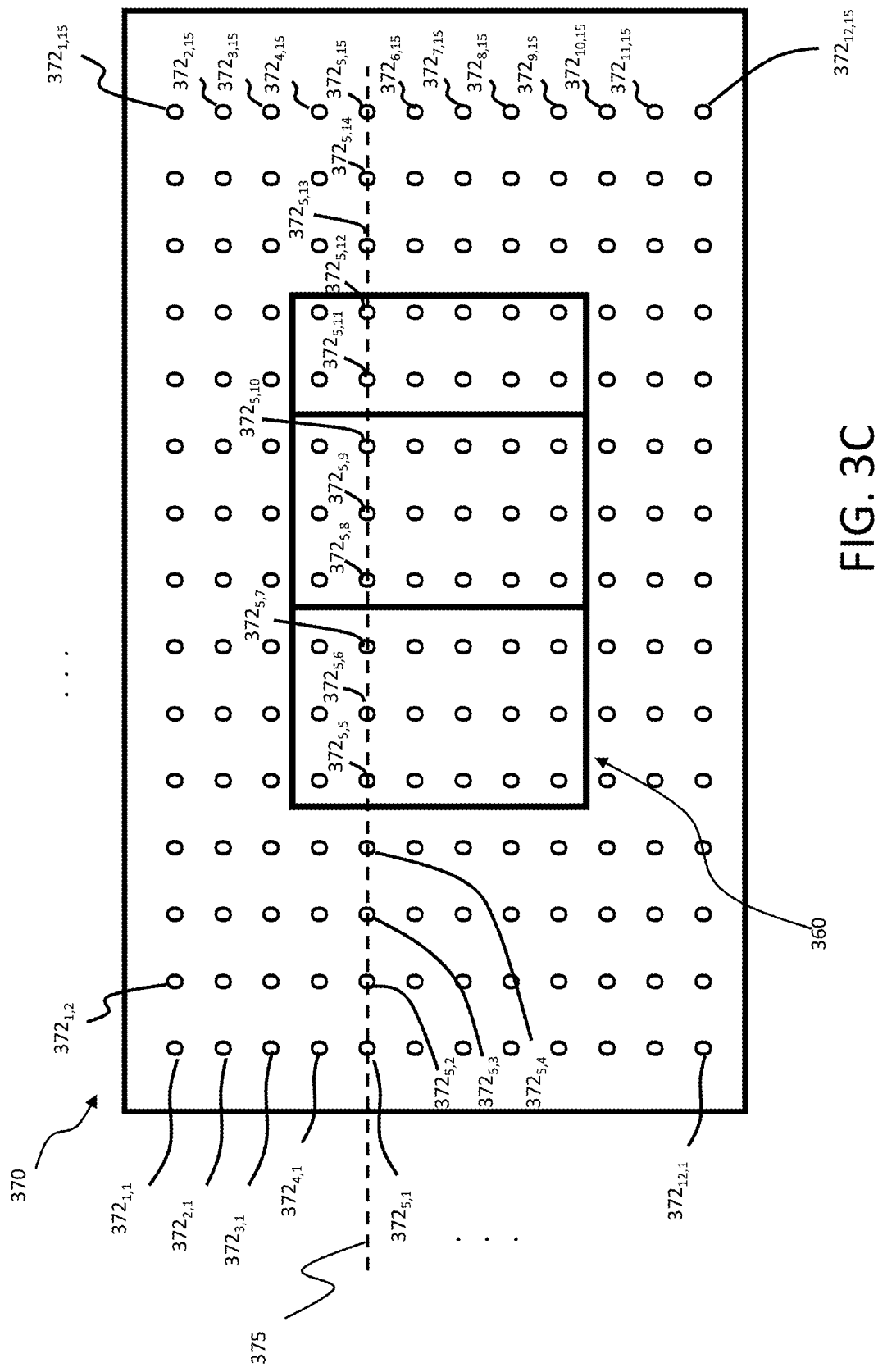
FIGS. 3C-3E depict a first set of physical locations represented by the first depth map, according to an embodiment herein.

FIG. 3B is an example diagram showing a first depth map generated by the first camera 340 of FIG. 3A, or generated based on information sensed by the first camera 340. In an embodiment, the first depth map 382 is a 2D array of pixels that identify depth values (e.g., in millimeters (mm) or centimeters (cm)) for a plurality of physical locations in the camera field of view 380 (shown in FIG. 3A). In the example of FIG. 3B, the first depth map 382 has a resolution of 12×15 pixels, which represent and identify respective depth values for a first set of physical locations $372_{1,1}$ through $372_{12,15}$ on a surface of the object 360 or platform 370 (both as shown in FIG. 3A), wherein the first set of physical locations $372_{1,1}$ through $372_{12,15}$ are represented by circles in FIG. 3C. More specifically, FIG. 3C depicts a top view of the object 360 and the platform 370 (both as shown in FIG. 3A), and illustrate the first set of physical locations $372_{1,1}$ through $372_{12,15}$ on one or more external surfaces of the object 360 or of the platform 370. As an example, the pixel $[1, 1]^T$ (row 1, column 1) in the first depth map 382 of FIG. 3B may identify a depth value of 250 cm for a corresponding physical location $372_{1,1}$ on a surface of the platform 370 (as illustrated in FIG. 3C). In another example, the pixel $[1, 2]^T$ (row 1, column 2) in the first depth map 382 identifies a depth value of also 250 cm for a corresponding physical location $372_{1,2}$ on the surface of the platform 370 (as also illustrated in FIG. 1C). As depicted in FIG. 3B, a portion 385 of the first depth map 382 may correspond with a surface of the object 360. While FIG. 3B depicts the first depth map 382 as having a resolution of 12×15 pixels, the first depth map 382 may have a different resolution in other examples, such as a resolution of 1280×1024 pixels, 320×240 pixels, 640×480 pixels, or a higher or lower resolution (e.g., 64×48 pixels or 204×204 pixels).

Figure 3D:
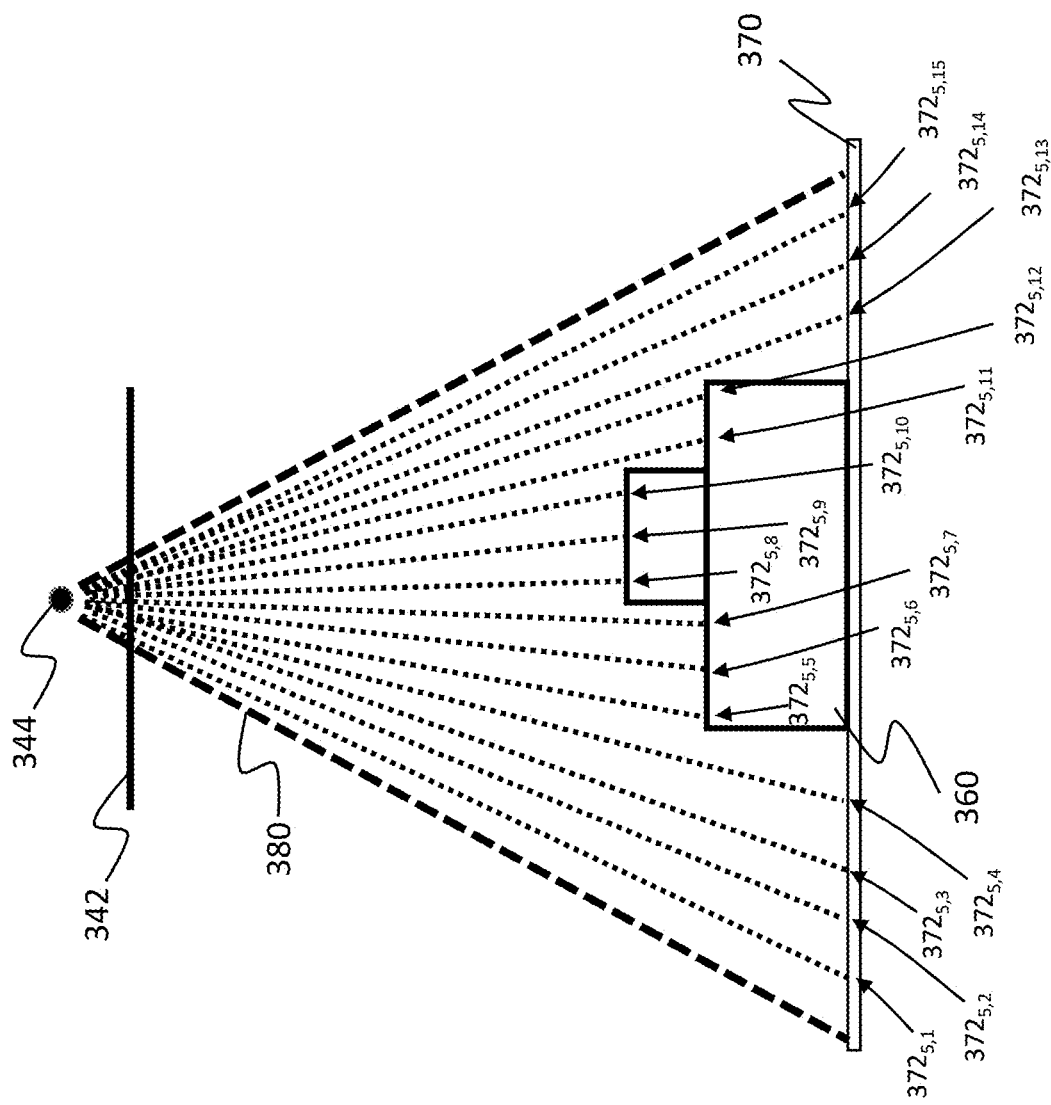

In an embodiment, the first set of physical locations $372_{1,1}$ through $372_{12,15}$ in FIG. 3C may be physical locations that project onto a camera sensor of the first camera 340. For instance, FIG. 3D depicts a subset of the physical locations $372_{1,1}$ through $372_{12,15}$, and more specifically depicts physical locations $372_{5,1}$ through $372_{5,15}$, that project onto respective regions of the camera sensor that correspond to pixels on row 5 of the first depth map 382. More specifically, FIG. 3D illustrates a side cross-sectional view of the object 360 and of the platform 370, cutting along a line 375 in FIG. 3C. The depiction in FIG. 3D models how reflected light from the physical locations $372_{5,1}$ through $372_{5,15}$ projects onto an image plane 342 defined by the camera sensor of the first camera 340, wherein an angle of the projection may be based on a location of a focal point 344 of the first camera 340 and/or a focal length of the first camera 340. The projection is depicted with dotted lines in FIG. 3D. In an embodiment, the projection may be characterized by a projection matrix K, which defines a relationship between a physical location having a coordinate of X', Y', Z' and a pixel having a pixel coordinate of a, b:

$$\begin{bmatrix} a \\ b \\ 1 \end{bmatrix} = K \begin{bmatrix} X'/Z' \\ Y'/Z' \\ 1 \end{bmatrix} \quad \text{Equation 1}$$

As stated above, the pixels of the depth map 382 in FIG. 3B represents depth values for the first set of physical locations (also referred to as physical points) $372_{1,1}$ through $372_{12,15}$ in FIG. 3C, wherein the depth values are relative to the first camera 340. The depth values of the first depth map 382 may refer to respective distances along the Z-axis in FIG. 3A.

Figure 3E:
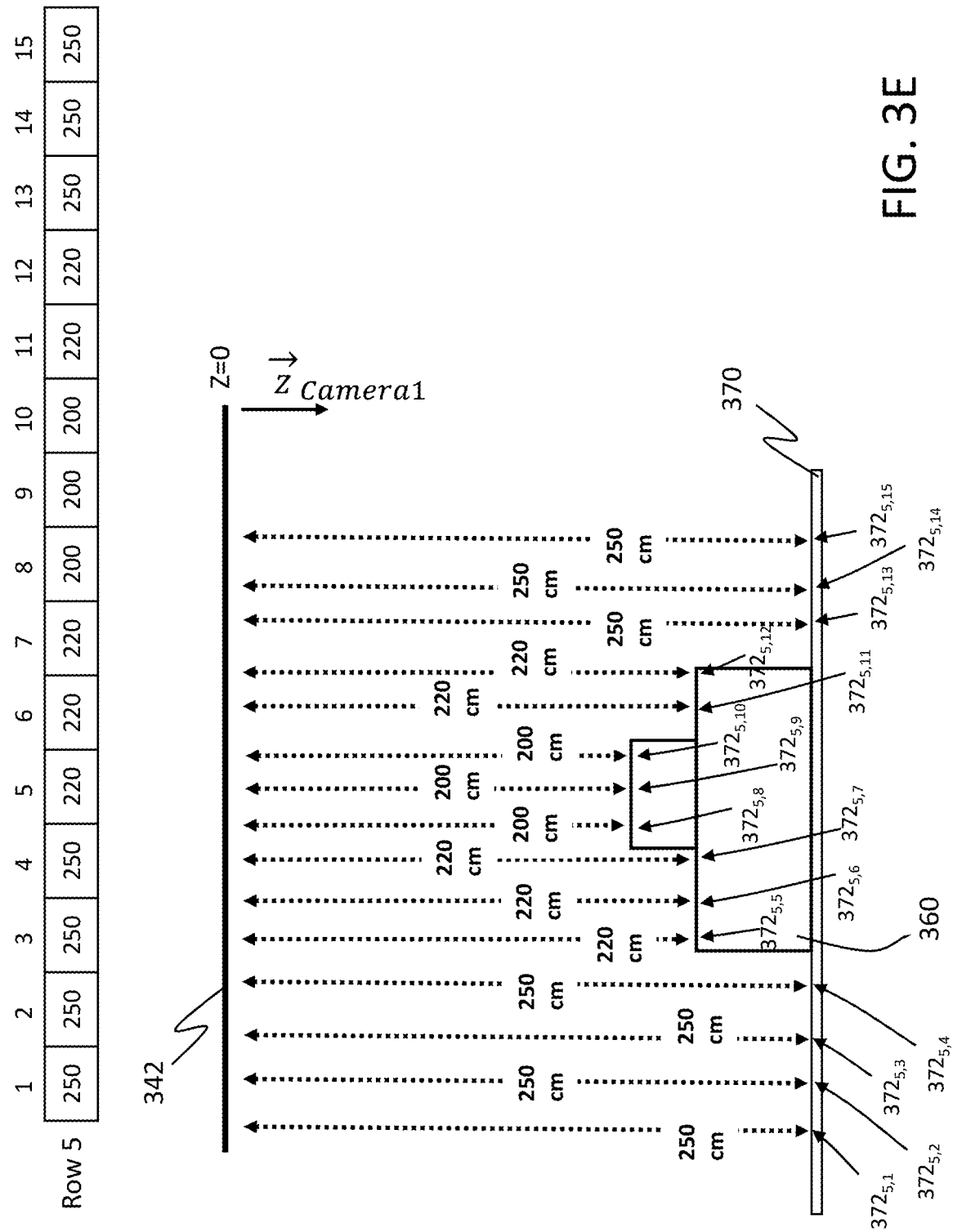

FIG. 3E provides a depiction of the depth values for a row of the first depth map 382 (of FIG. 3B), and more specifically for row 5 of the first depth map 382. The pixels of row 5 correspond with the subset of physical locations $372_{5,1}$ through $372_{5,15}$ (which are the same subset of physical locations as depicted in FIG. 3D). That is, pixels $[5, 1]^T$ through $[5, 15]^T$ identify respective depth values for physical locations $372_{5,1}$ through $372_{5,15}$. As illustrated in FIG. 3E, the depth values in the first depth map 382 may refer to respective distances, along the Z-axis of the coordinate system of the first camera 340, between the subset of physical locations $372_{5,1}$ through $372_{5,15}$ and the image plane 342 of the first camera 340 (of FIG. 3A). In such an example, the image plane 342 may define a depth of zero for the first depth map 382. As stated above, a depth value identified by a particular pixel may refer to, e.g., a Z-component or other component of a 3D coordinate of the physical location represented by the pixel.

Figure 3F:
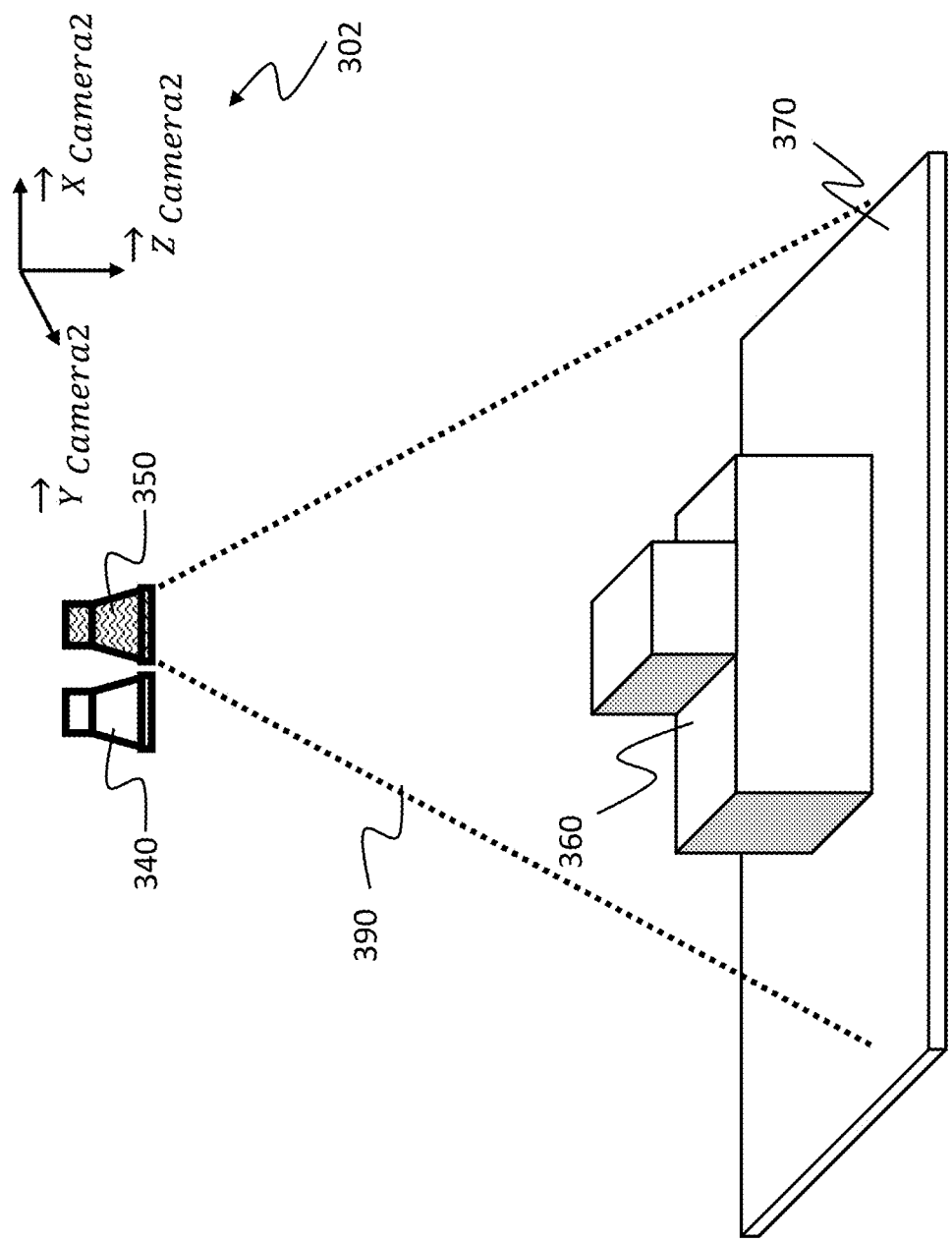
FIG. 3F depicts a vision system in which a first camera and a second camera sense information from which depth maps can be generated, according to an embodiment herein.
Figure 3G:
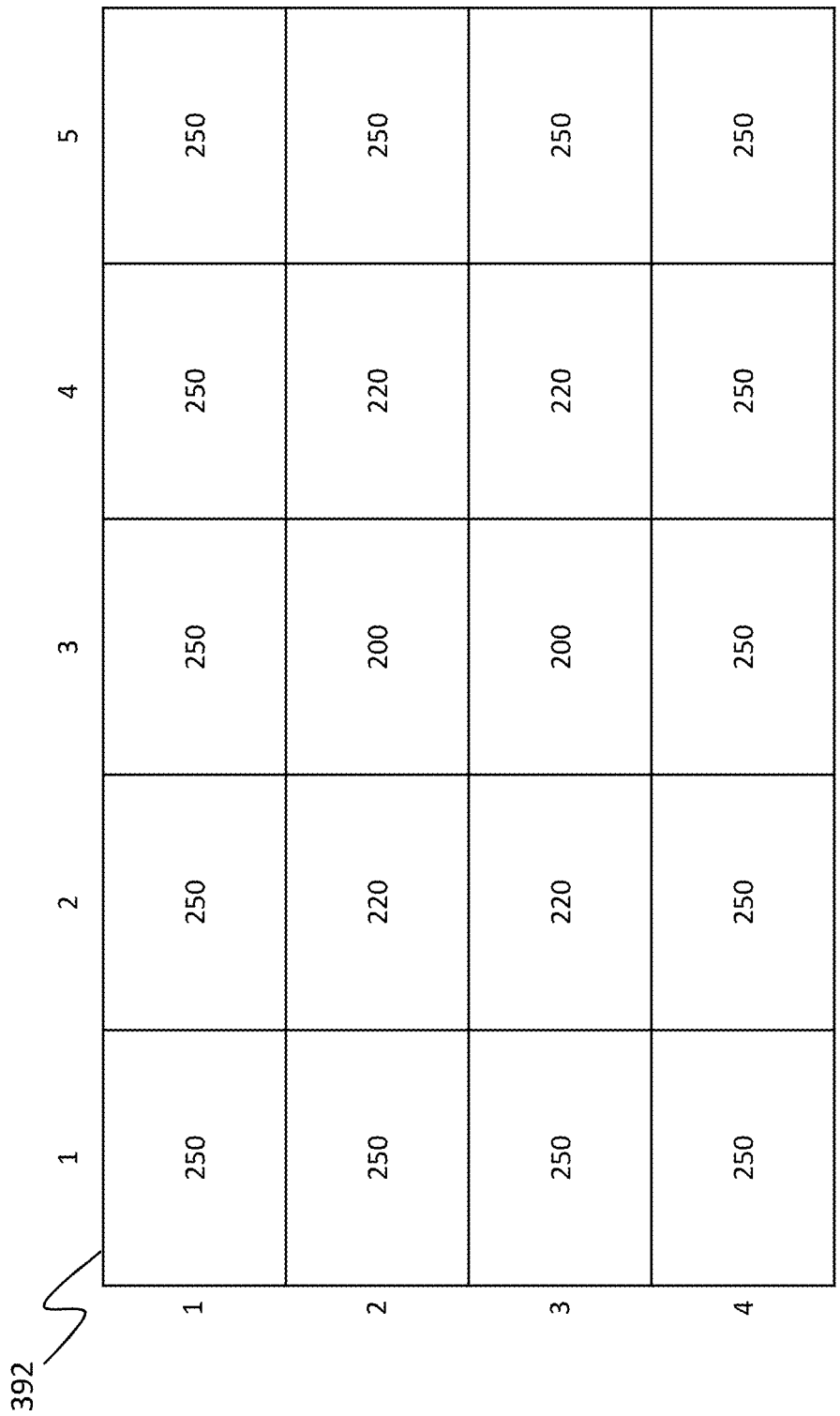
FIG. 3G depicts a second depth map, according to an embodiment herein.

FIG. 3F depicts a camera field of view 390 of the second camera 350 and coordinate axes 302 of a coordinate system of the second camera 350. An origin of the coordinate system may be located on, e.g., an image plane of the second camera 350, a lens of the second camera 350, or any other location. FIG. 3G illustrates a second depth map 392 generated by the second camera 350 (of FIG. 3F), or generated based on information sensed by the second camera 350. The second depth map 392 may also identify depth values for physical locations on one or more surfaces in the camera field of view 390 (of FIG. 3F). Because the camera field of view 390 of the second camera 350 is located slightly to the right of the camera field of view 380 of the first camera 340, the second depth map 392 may cover a slightly different region than covered by the first depth map 382.

As depicted in FIGS. 3G and 3H, the second depth map 392 in this example may have 4×5 pixels that identify respective depth values for a second set of physical locations $373_{1,1}$ through $373_{4,5}$. The physical locations $373_{1,1}$ through $373_{4,5}$ are represented by circles in FIG. 3H, which provide a top view of the object 360 and the platform 370 (both of FIGS. 3A and/or 3F). The second set of physical locations $373_{1,1}$ through $373_{4,5}$ may be physical locations which project onto regions of an image sensor of the second camera 350 (of FIG. 3F) that correspond with respective pixels of the second depth map 392, in a manner similar to the description in FIG. 3D for the first set of physical locations $372_{1,1}$ through $372_{12,15}$. The second set of physical locations $373_{1,1}$ through $373_{4,5}$ may have one or more locations in common with the first set of physical locations $372_{1,1}$ through $372_{12,15}$, or may have no locations in common with the first set of physical locations $372_{1,1}$ through $372_{12,15}$. While the second depth map 392 in this example has a resolution of 4×5 pixels, it may have a different resolution in other examples, such as 1280×1024 pixels, 320×240 pixels, 640×480 pixels, or a higher or lower spatial resolution (e.g., 64×48 pixels or 204×204 pixels).

In an embodiment, the pixels of the second depth map 392 identify respective depths for the second set of physical locations $373_{1,1}$ through $373_{4,5}$. Like in the first depth map 382, the depth values of the second depth map 392 may refer to respective distances along a coordinate axis in a coordinate system of the second camera 340, such as the Z axis of FIG. 3F. The distances may be from the second set of physical locations $373_{1,1}$ through $373_{4,5}$ to an image plane of the second camera 350. In some cases, when a particular pixel in the second depth map 392 represents a physical location having a 3D coordinate of [X, Y, Z] in the coordinate system of the second camera 350, a depth value identified by the pixel may refer to a Z-component of the 3D coordinate of the physical location.

The first depth map 382 in FIG. 3B and the second depth map 392 in FIG. 3G have depth information for every pixel in the respective depth maps 382/392. This may involve, e.g., a situation in which there is little to no noise or other source of error. However, in some situations, a depth map that is generated based on information sensed by one camera may have empty pixels, which are pixels having no depth information. One aspect of the present disclosure relates to compensating for such sources of error by supplementing a first depth map based on information from a second depth map, so as to generate an updated first depth map which has more complete depth information.

Figure 4:
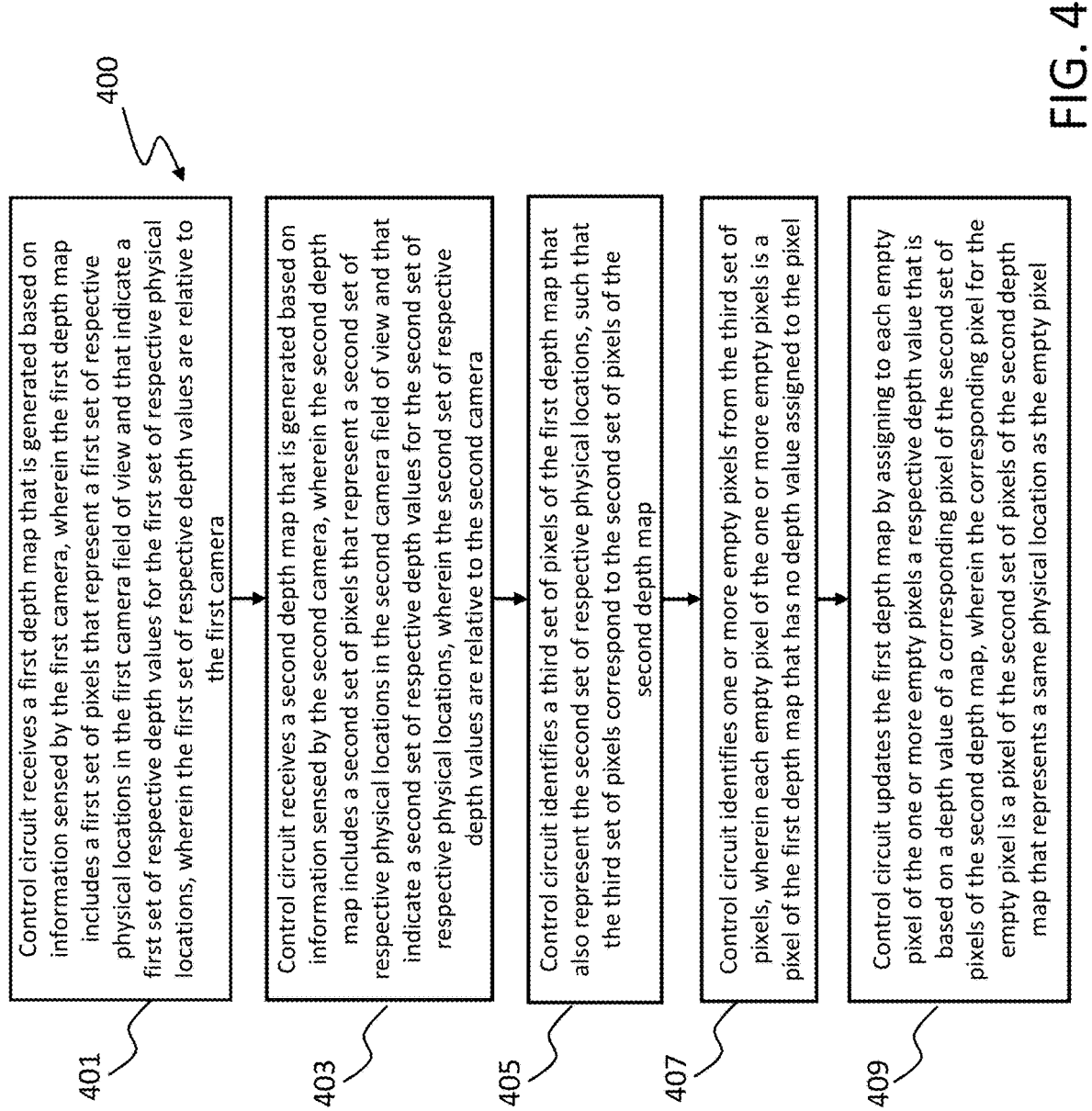
FIG. 4 provides a flow diagram that illustrates a method for updating a depth map, according to an embodiment herein.
Figure 5A:
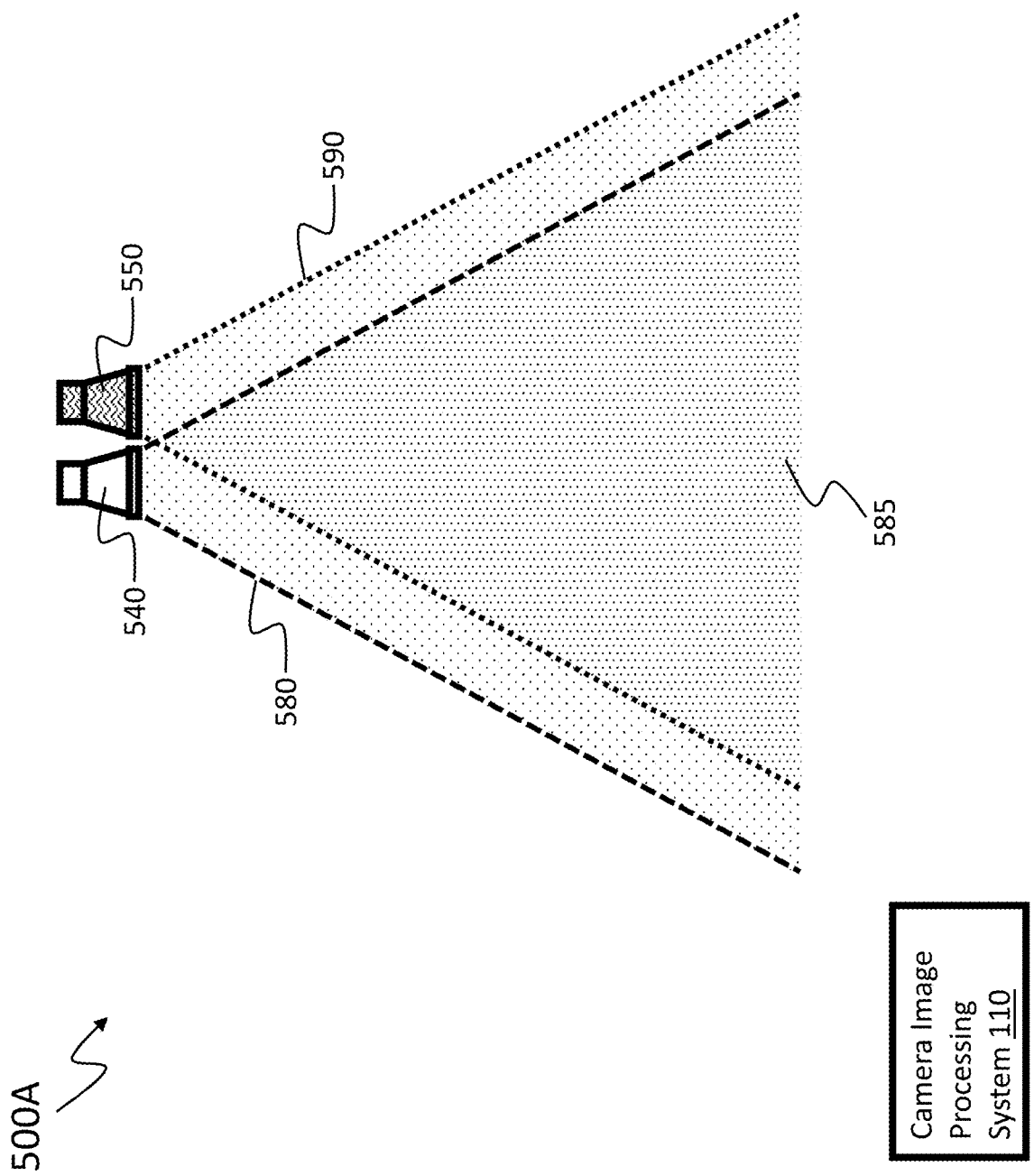
FIGS. 5A and 5B depict vision systems in which a first camera and a second camera sense information from which depth maps can be generated, according to embodiments herein.
Figure 5B:
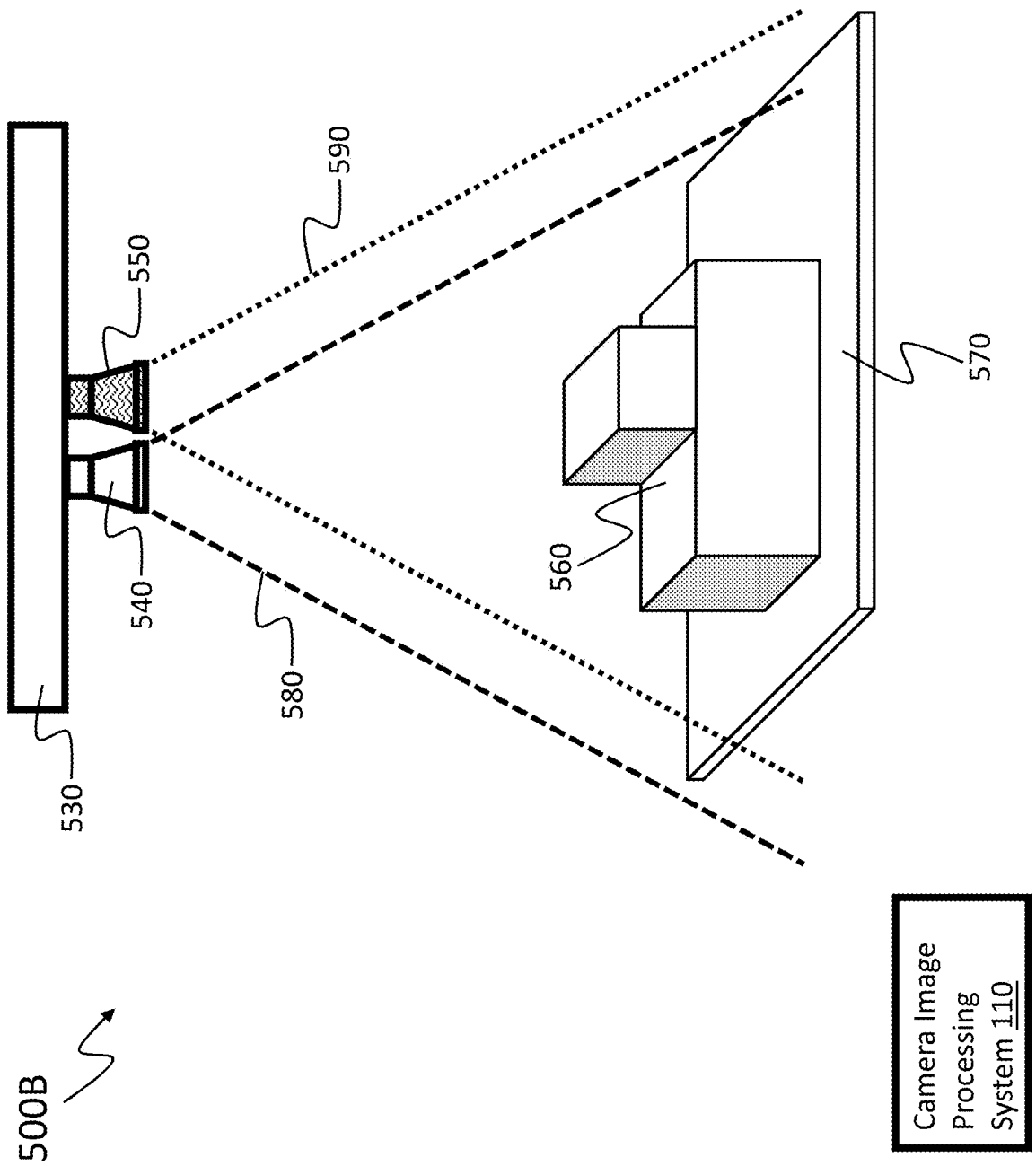

FIG. 4 depicts a flow diagram that illustrates a method 400 for supplementing a first depth map based on depth values in a second depth map. In an embodiment, the method 400 may be performed by the control circuit 111 of the camera image processing system 110 of FIGS. 1A and 1B. An example environment in which the method 400 is performed is depicted in FIGS. 5A and 5B, which depict a vision system 500A/500B that each includes the camera image processing system 110 in communication with a first camera 540 and a second camera 550. The first camera 540 may be an embodiment of the first camera 140/240/340 of FIG. 1A, 2, or 3A, respectively, and the second camera 550 may be an embodiment of the second camera 150/250/350 of FIG. 1A 2, or 3F, respectively. The first camera 540 has a first camera field of view 580 and the second camera 550 has a second camera field of view 590. The first camera field of view 580 and the second camera field of view 590 at least partially overlaps with each other, and form an overlapping field of view 585 (see FIG. 5A). The camera image processing system may be configured to communicate with the first camera 540 and the second camera 550 via the communication interface 113 of FIG. 1B. In some cases, the first camera 540 that the communication interface 113 is configured to communicate with may be a first type of depth-sensing camera (e.g., a structured light camera), and the second camera 550 that the communication interface 113 is configured to communicate with may be a second type of depth-sensing camera (e.g., TOF camera) different from the first type of depth-sensing camera.

In an embodiment, the first camera 540 and the second camera 550 may be directly or indirectly attached in a manner that causes them to be stationary relative to each other. For instance, FIG. 5B depicts a vision system 500B that includes a mounting structure 530 (e.g., camera mount) attached to both the first camera 540 and the second camera 550. In an embodiment, the mounting structure may be configured to prevent relative movement between the first camera 540 and the second camera 550. FIG. 5B further depicts an example in which a depth map is generated for an object 560 and a platform 570 that are in the camera field of view 580 of the first camera 540 and in the camera field of view 590 of the second camera 550.

Returning to FIG. 4, in an embodiment the method 400 may begin with step 401, in which the control circuit 111 receives a first depth map that is generated based on information (e.g., structured light information) sensed by the first camera 540 of FIGS. 5A and 5B (with which the communication interface 113 of FIG. 1B is configured to communicate). The first depth map may include a first set of pixels that represent a first set of respective physical locations in the camera field of view 580 of the first camera 540, with which the communication interface 113 is configured to communicate. The first depth map may indicate respective depth values for the first set of respective physical locations. The first set of respective depth values may be relative to the first camera 540. In an embodiment, the first set of respective physical locations may be physical locations that project onto the first set of pixels. As stated above, the depth values indicated by the first set of pixels may be respective distances along a coordinate axis of a coordinate system of the first camera 540, such as a Z-axis. The distances may be between the first set of physical locations and the first camera 540.

In an embodiment, the control circuit 111 in step 401 may receive the first depth map from the first camera 540 via the communication interface 113 of FIG. 1B. For instance, the first camera 540 may be configured to generate the first depth map based on sensed information (e.g., structured light information), and to transmit the first depth map to the control circuit 111 of the camera image processing system 110. The control circuit 111 may be configured to receive the first depth map from the first camera 540 via the communication interface 113 of the camera image processing system 110.

In an embodiment, the control circuit 111 in step 401 may receive the first depth map from the non-transitory computer-readable medium 115 of FIG. 1B, or from another storage medium (such a step may also be referred to as retrieving the first depth map from the non-transitory computer-readable medium 115 or other storage medium). In this embodiment, the first depth map may be generated by a device other than the first camera 540. For instance, the camera image processing system 110 may generate the first depth map based on structured light information, time-of-flight information, or any other information sensed by the first camera 540, and generate the first depth map based on the sensed information and store the first depth map in the non-transitory computer-readable medium 115. The control circuit 111 may retrieve or otherwise receive the first depth map from the non-transitory computer-readable medium 115 as the first depth map is being generated, or after the first depth map has been generated.

Figure 6A:
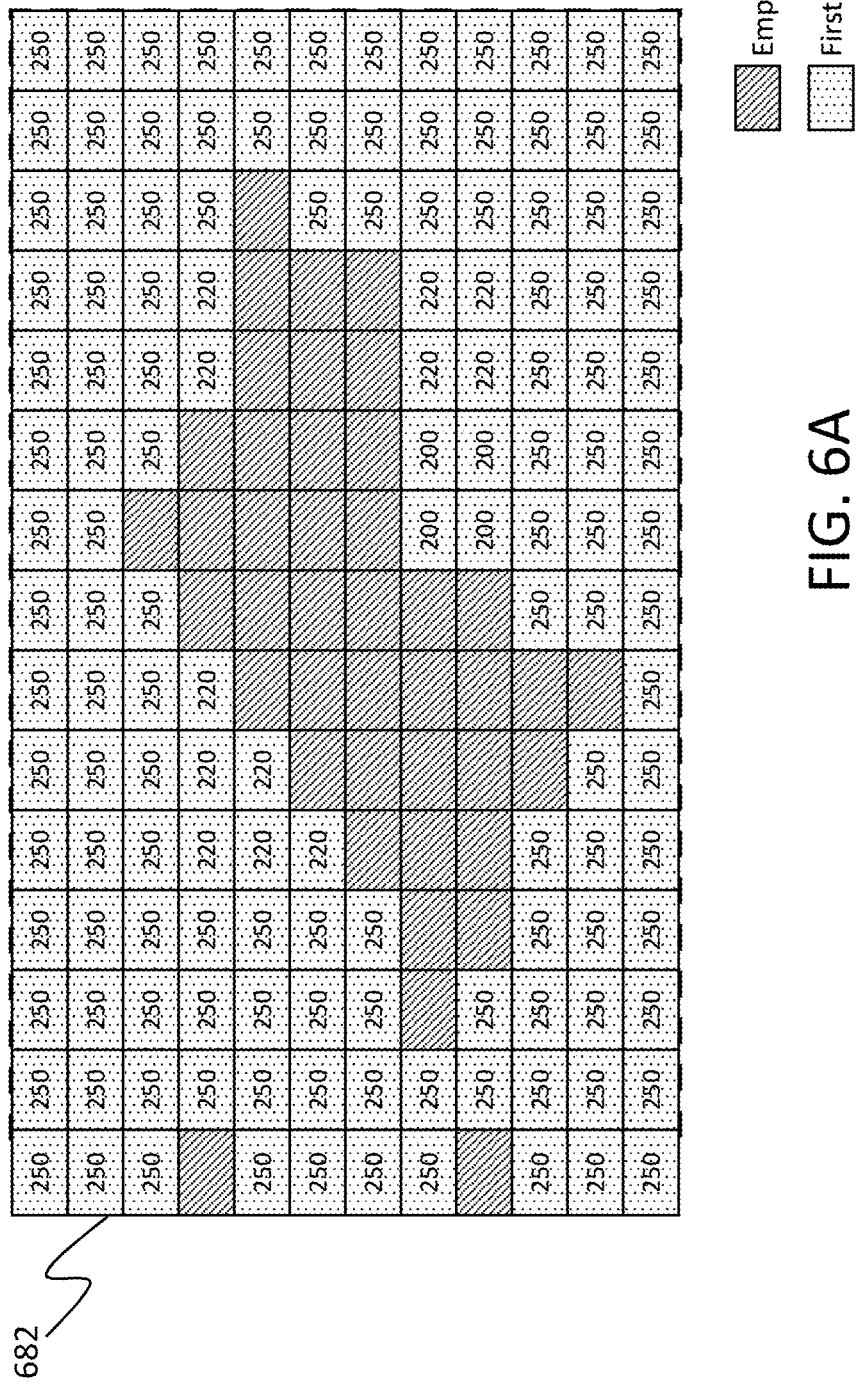

FIG. 6A illustrates an example first depth map 682 that is received in step 401. Like the first depth map 382 of FIG. 3B, the first depth map 682 in the example of FIG. 6A has a resolution of 12×15 pixels, but can have a different resolution in other examples. FIG. 6A illustrates the first set of pixels in the first depth map 682 that have depth information. More specifically, the depth information identifies a first set of respective depth values for a first set of respective physical locations. The first set of respective physical locations may be a subset of the physical locations $372_{1,1}$ through $372_{12,15}$ of FIG. 3C. The first set of respective depth values may be relative to the first camera 540 of FIG. 5A/5B, similar to the description with respect to FIG. 3E. FIG. 6A further illustrates the first depth map 682 having a plurality of empty pixels, which are pixels that have no depth information (e.g., no assigned depth values). As stated above, the empty pixels may arise as a result of interference or some other reason (e.g., a geometry or surface property of the object 560 of FIG. 5B). In an embodiment, each pixel of the first set of pixels of the first depth map 682 may include only depth information. In another embodiment, each pixel of the first set of pixels of the first depth map 682 may also include information identifying a 3D coordinate of a physical location represented by the pixel. For instance, the pixel may be assigned a depth value that represents a Z component of the 3D coordinate, and may further be assigned a value of an X component and a value of a Y component of the 3D coordinate.

Returning to FIG. 4, the method 400 may further include step 403, in which the control circuit 111 receives a second depth map that is generated based on information (e.g., time-of-flight information) sensed by the second camera 550 (with which the communication interface 113 of FIG. 1B is configured to communicate). The second depth map includes a second set of pixels that represent a second set of physical locations in the second camera field of view 590 and that indicate a second set of respective depth values for the second set of respective physical locations. The second set of respective depth values may be relative to the second camera 550, with which the communication interface 113 is configured to communicate. In an embodiment, the second set of respective depth values may indicate respective distances along a coordinate axis (e.g., Z axis) of a coordinate system of the second camera. The distances may be between the second camera 550 and the second set of respective physical locations.

In an embodiment, the control circuit 111 in step 403 may receive the second depth map from the second camera 550 via the communication interface 113 of FIG. 1B. For instance, the second camera 550 may be configured to generate the second depth map based on sensed information (e.g., time-of-flight information), and to transmit the second depth map to the control circuit 111 of the camera image processing system 110. The control circuit 111 may be configured to receive the second depth map from the second camera 550 via the communication interface 113 of the camera image processing system 110.

In an embodiment, the control circuit 111 in step 403 may receive the second depth map from the non-transitory computer-readable medium 115 of FIG. 1B, or from another device (this step may also be referred to as retrieving the second depth map from the non-transitory computer-readable medium 115 or other storage medium). In this embodiment, the second depth map may be generated by a device other than the second camera 550. For instance, the camera image processing system 110 may generate the second depth map based on structured light information, time-of-flight information, or any other information sensed by the second camera 550, and generate the second depth map based on the sensed information and store the second depth map in the non-transitory computer-readable medium 115. The control circuit 111 may retrieve or otherwise receive the second depth map from the non-transitory computer-readable medium 115 as the second depth map is being generated, or after the second depth map has been generated.

Figure 6B:
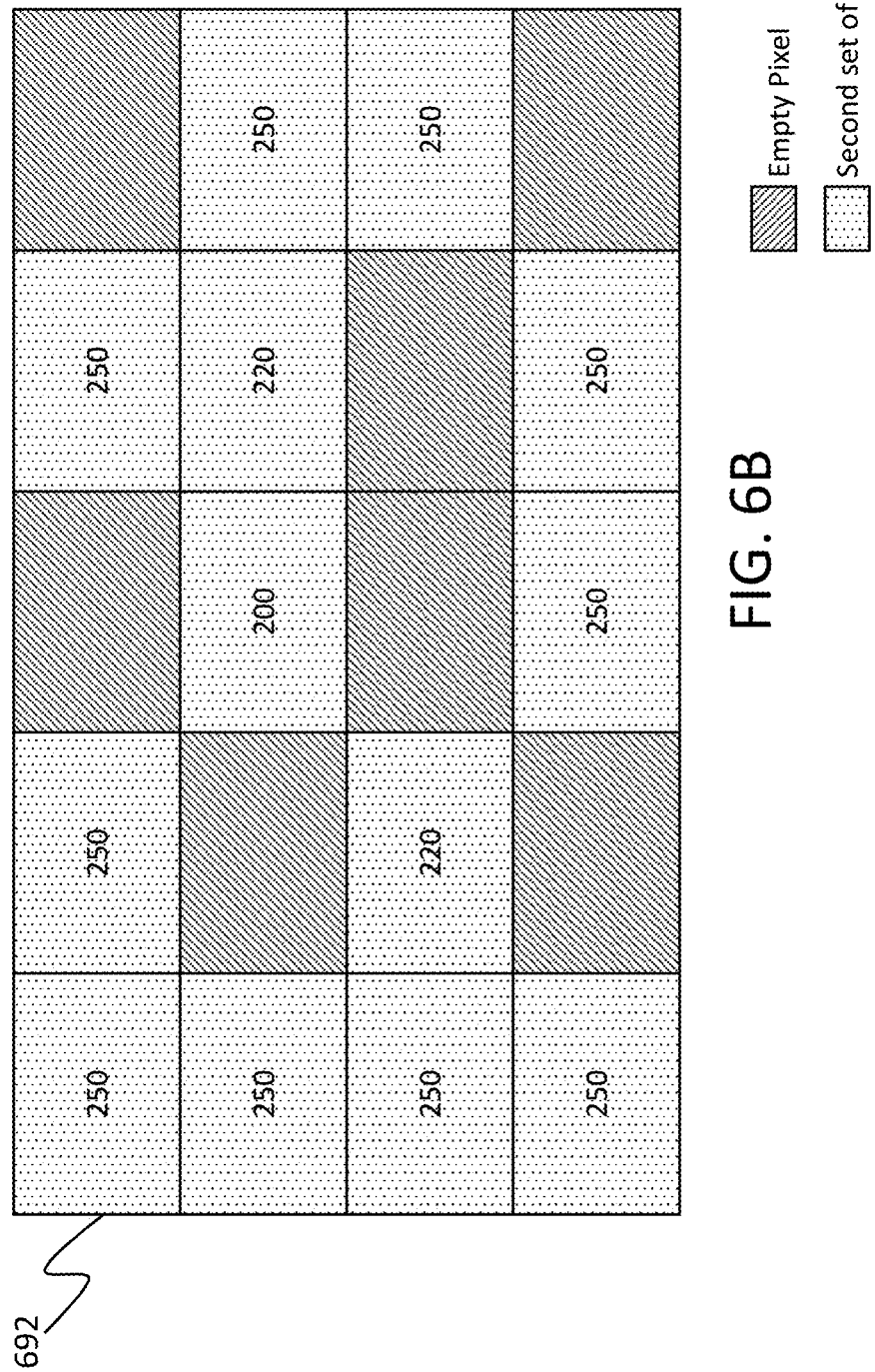

FIG. 6B illustrates an example second depth map 692 that is received in step 403. Like the second depth map 392 of FIG. 3G, the second depth map 692 in the example of FIG. 6B has a resolution of 4×5 pixels, but may have a different resolution in other examples. The second set of pixels in the second depth map 692 may represent a second set of physical locations and indicate respective depth values for the second set of physical locations. In an embodiment, the second set of physical locations may be a subset of the physical locations $373_{1,1}$ through $373_{4,5}$ in FIG. 3H. The depth values may be relative to the second camera 550 of FIG. 5A/5B, and may indicate distances along a coordinate axis, such as a Z axis. The distances may be between the second set of physical locations and the second camera 550. In an embodiment, each pixel of the second set of pixels of the second depth map 692 may include only depth information. In another embodiment, each pixel of the second set of pixels of the second depth map 692 may also include information identifying a 3D coordinate of a physical location represented by the pixel. For instance, the pixel may be assigned a depth value that represents a Z component of the 3D coordinate, and may further be assigned a value of an X component and a value of a Y component of the 3D coordinate.

Returning to FIG. 4, the method 400 may further include step 405, in which the control circuit 111 identifies a third set of pixels of the first depth map 682 that also represent the second set of respective physical locations. The third set of pixels may thus correspond to the second set of pixels. For instance, if a particular pixel in the second depth map 692 identifies a depth value for a particular location on object 560, step 405 may involve determining which pixel of the first depth map 682 also represents that particular location on the object 560. The pixel identified from the first depth map 682 and the pixel in the second depth map 692 may thus correspond to the same physical location, and thus correspond to each other. The pixel of the second depth map may then be used to provide depth information for the corresponding pixel of the first depth map 682, as discussed in more detail below.

In one example of step 405, the second set of pixels of the second depth map may have or be represented by a set of respective pixel coordinates, and the control circuit 111 is configured to identify the third set of pixels of the first depth map by determining an additional set of respective pixel coordinates based on the set of respective pixel coordinates and based on a transformation function which defines a spatial relationship between the first camera 540 and the second camera 550, wherein the additional set of respective pixel coordinates identify the third set of pixels. As discussed above, the second camera 550 has the second camera field of view 590 that is slightly different from the first camera field of view 580 of the first camera 540, because the position of the second camera 550 is different from the position of the first camera 540. Therefore, a transformation function which describes a spatial relationship between the first camera 540 and the second camera 550 may need to be used to determine which pixels of the first depth map 682 correspond to pixels of the second depth map 692.

For instance, the third set of pixels may be determined based on an inverse projection matrix of the first camera 540, an inverse projection matrix of the second camera 550, and a transformation function that describes a spatial relationship between the first camera 540 and the second camera 550. More specifically, this example may involve determining, for each pixel $[u\ v]^T$ of the second set of pixels of the second depth map, a 3D coordinate of a physical location represented by the pixel $[u\ v]^T$ of the second depth map, and determining which pixel $[a\ b]^T$ of the first depth map does that physical location project onto. In the above example, the depth value identified by the pixel $[u\ v]^T$ may be a Z component of a 3D coordinate of the physical location. Determining the 3D coordinate of the physical location represented by the pixel $[u\ v]^T$ may thus involve determining an X component and a Y component of the 3D coordinate. The determination may rely on, e.g., the equation:

$$\begin{bmatrix} X/Z \\ Y/Z \\ 1 \end{bmatrix}_{Second} = K_{Second}^{-1} \begin{bmatrix} u \\ v \\ 1 \end{bmatrix} \qquad \text{Equation 2}$$

The above equation may determine a 3D coordinate $[X\ Y\ Z]_{Second}^T$ of a physical location represented by the pixel $[u\ v]$, wherein the 3D coordinate $[X\ Y\ Z]_{Second}^T$ is in a coordinate system of the second camera. In the above example, $K_{Second}^{-1}$ refers to an inverse projection matrix for the second camera 550. The inverse projection matrix $K_{Second}^{-1}$ may describe a relationship between a 3D coordinate of a physical location in a coordinate system of the second camera 550 and a pixel coordinate of a pixel onto which the physical location projects. The inverse projection matrix $K_{Second}^{-1}$ may be an inverse of a projection matrix $K_{Second}$ of the second camera 550. In an embodiment, the control circuit 111 may determine the projection matrix $K_{Second}$ of the second camera 550 by performing intrinsic camera calibration for the second camera 550. In an embodiment, the projection matrix $K_{Second}$ may have already been determined, such as by the robot control system 170 of FIG. 1E or by a manufacturer of the second camera 550, and provided to the control circuit 111 before step 405 is performed. Intrinsic camera calibration and projection matrices are discussed in more detail in U.S. patent application Ser. No. 16/295,940, titled "Method and System for Performing Automatic Camera Calibration for Robot Control," the entire content of which is incorporated by reference herein.

The above example of step 405 may further involve converting the coordinate $[X\ Y\ Z]_{Second}^T$ from being in a coordinate system of the second camera 550 (which is also the coordinate system of the second depth map) to being in a coordinate system of the first camera 540 (which is also the coordinate system of the first depth map). This determination may be based on the equation:

$$\begin{bmatrix} X' \\ Y' \\ Z' \\ 1 \end{bmatrix}_{First} = T_{First}^{Second} \begin{bmatrix} X \\ Y \\ Z \\ 1 \end{bmatrix}_{Second} \qquad \text{Equation 3}$$

The above example determines a 3D coordinate $[X'\ Y'\ Z']_{First}^T$ of the physical location represented by the pixel $[u\ v]$ of the second depth map, wherein the 3D coordinate is in a coordinate system of the first camera 540 and of the first depth map 682. In the above example, $T_{First}^{Second}$ refers to a transformation function that defines the spatial relationship between the first camera 540 and the second camera 550. For instance, $T_{First}^{Second}$ may include a rotation matrix and a translation vector that describe a distance between the first camera 540 and the second camera 550 and describe an orientation of the second camera 550 relative to the first camera 540. In an embodiment, the control circuit 111 may determine $T_{First}^{Second}$ by performing stereo calibration to determine the spatial relationship between the first camera 540 and the second camera 550. In an embodiment, $T_{First}^{Second}$ may have already been determined, such as by a robot control system 170 of FIG. 1E or a camera operator that deployed the first camera 540 and second camera 550. The determined transformation function may have been provided to the control circuit 111 before step 405.

The above example of step 405 may further involve identifying which pixel in the first depth map corresponds with the physical location $[X'\ Y'\ Z']_{First}^T$. This determination may be based on the following equation:

$$\begin{bmatrix} a \\ b \\ 1 \end{bmatrix}_{Round} = K_{First} \begin{bmatrix} X'/Z' \\ Y'/Z' \\ 1 \end{bmatrix}_{First} \qquad \text{Equation 4}$$

In the above example, $K_{First}$ refers to a projection matrix of the first camera 540, and $[a\ b]^T$ is a pixel coordinate of a pixel in the first depth map onto which the physical location $[X'\ Y'\ Z']_{First}^T$ projects (this physical location is also represented as $[X\ Y\ Z]_{Second}^T$). The projection matrix $K_{First}$ may be determined by the control circuit 111 via intrinsic camera calibration, or may have already been determined and provided to the control circuit 111 before step 405. The values $[a\ b]^T$ may be obtained by rounding a result of the above calculation to nearest integers. The pixel $[a\ b]^T$ in the first depth map may correspond with the pixel $[u\ v]^T$ in the second depth map, because they represent the same physical location.

Figure 6C:
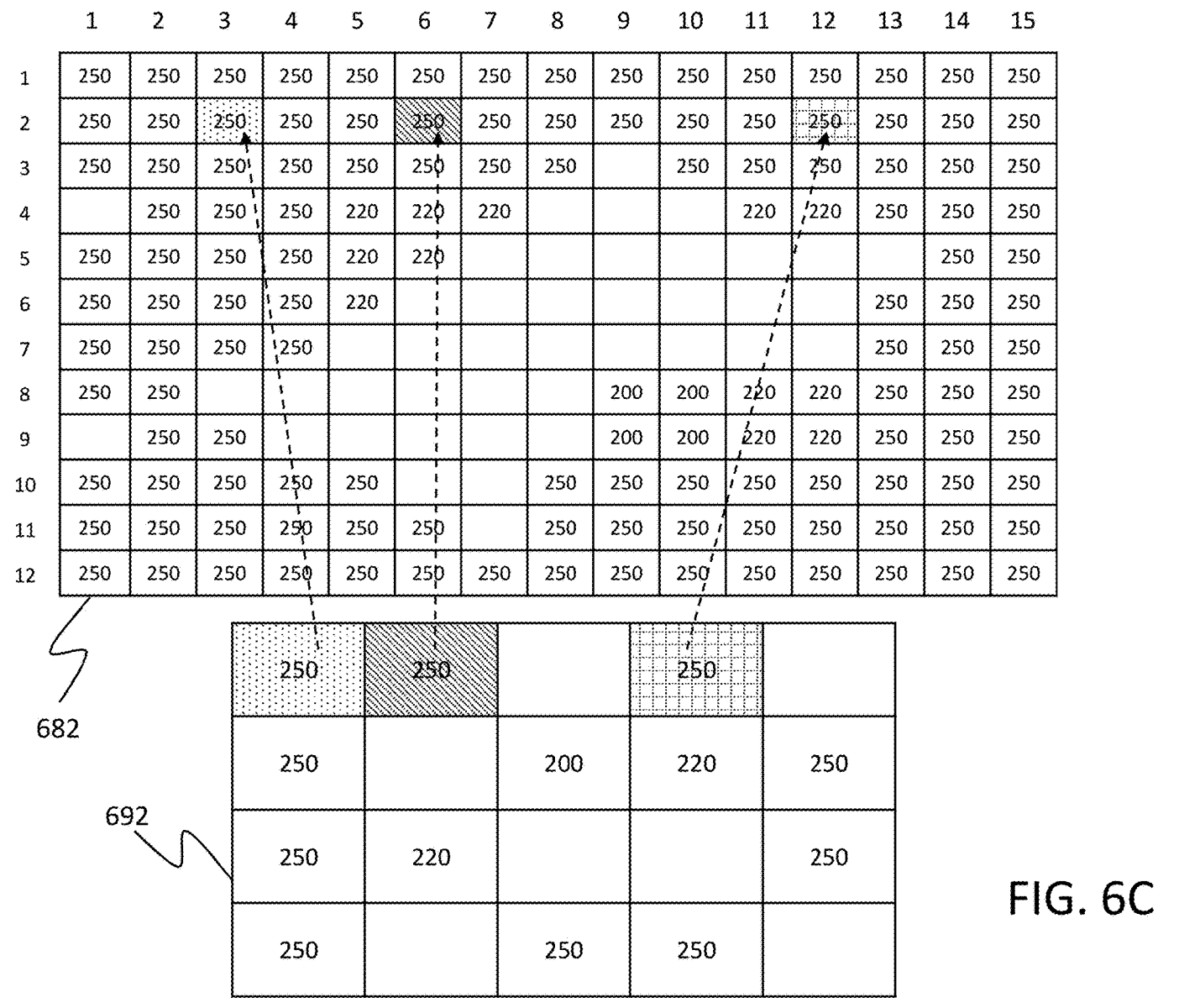
Figure 6D:
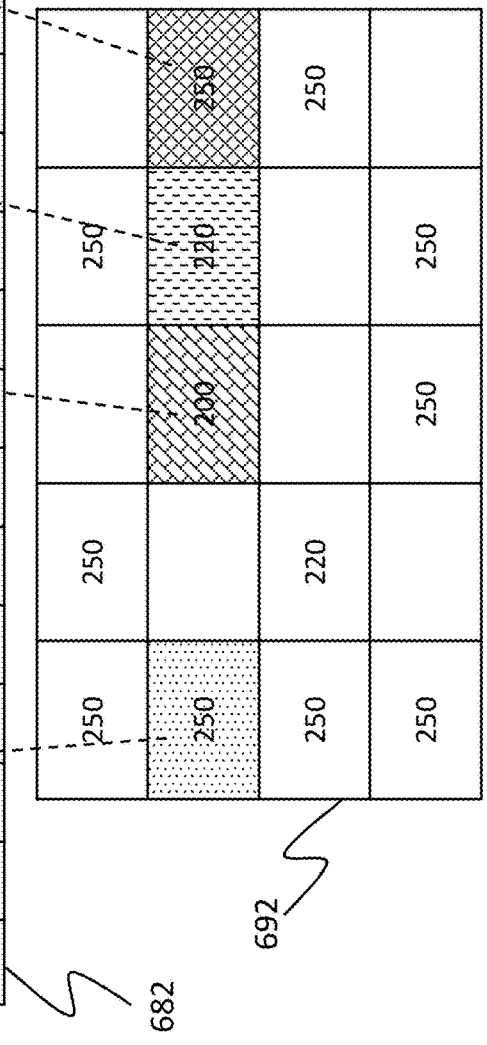
Figure 6E:
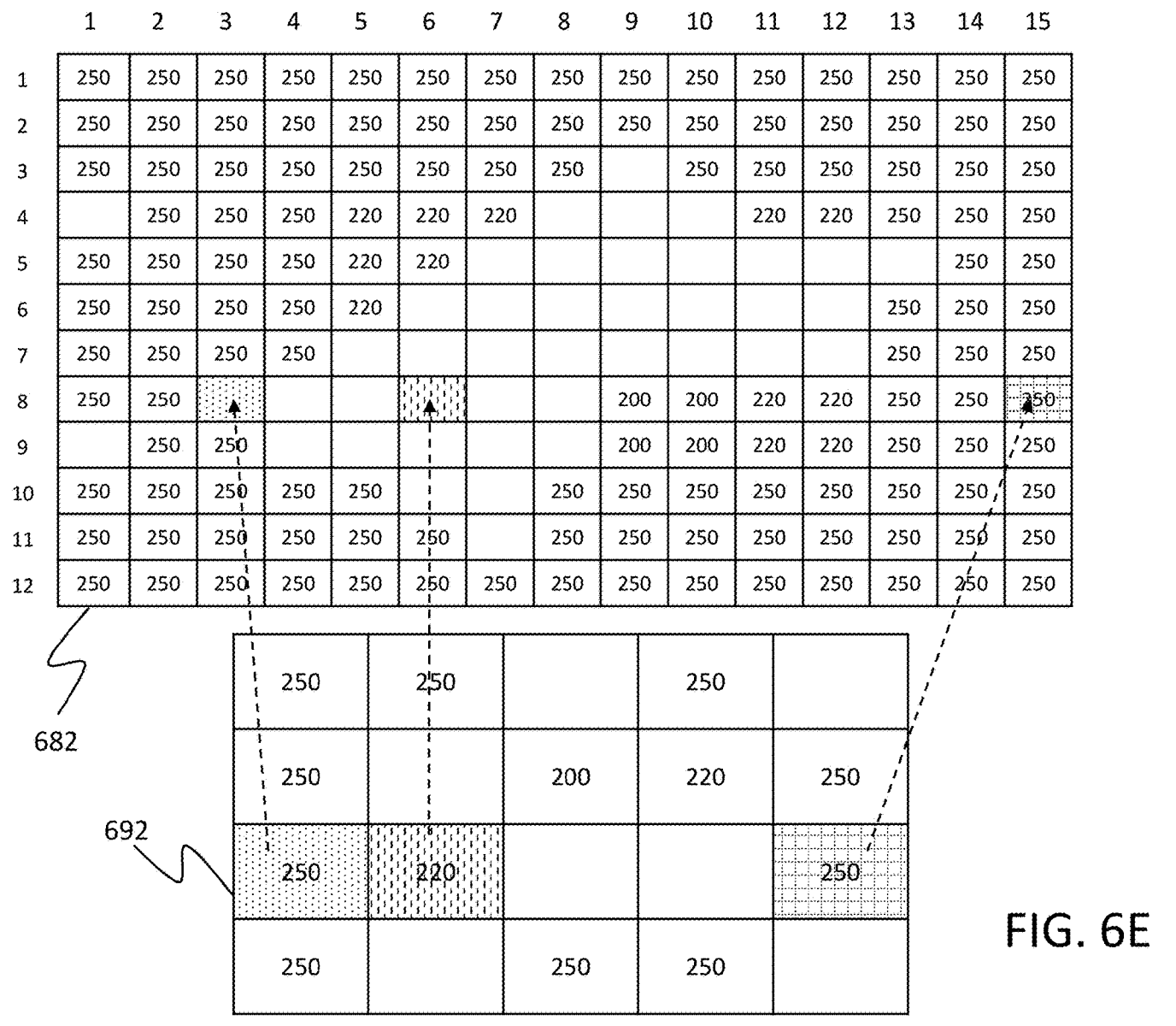

FIGS. 6C-6F graphically depict an example of step 405 in which the control circuit 111 of FIG. 5A/5B identifies a third set of pixels of the first depth map 682 that corresponds to the second set of pixels of the second depth map 692, wherein the third set of pixels of the first depth map also represent the second set of respective physical locations. More specifically, FIGS. 6C through 6F illustrate which pixels of the first depth map 682 correspond to the second set of pixels in the first row through the fourth row, respectively, of the second depth map 692. For instance, as illustrated in FIGS. 6C-6F, the second set of pixels of the second depth map 692 have the following pixel coordinates: $[1, 1]^T$, $[1, 2]^T$, and $[1, 4]^T$ in the first row of the second depth map 692, $[2, 1]^T$, $[2, 3]^T$, $[2, 4]^T$ and $[2, 5]^T$ in the second row of the second depth map 692, $[3, 1]^T$, $[3, 2]^T$, $[3, 5]^T$ of the third row of the second depth map 692, and $[4, 1]^T$, $[4, 3]^T$, and $[4, 4]^T$ of the fourth row of the second depth map. As further illustrated in FIGS. 6C-6F, the second set of pixels in second depth map correspond to the following pixel coordinates for the third set of pixels in the first depth map: $[2, 3]^T$, $[2, 6]^T$, $[2, 12]^T$ in the second row of the first depth map (as depicted in FIG. 6C), $[5, 3]^T$, $[5, 9]^T$, $[5, 12]^T$, $[5, 15]^T$ in the fifth row of the first depth map (as depicted in FIG. 6D), $[8, 3]^T$, $[8, 6]^T$, $[8, 15]^T$ in the eighth row of the first depth map (as depicted in FIG. 6E), and $[11, 3]^T$, $[11, 9]^T$, and $[11, 12]^T$ in the eleventh row of the first depth map (as depicted in FIG. 6F), respectively.

Returning to FIG. 4, the method 400 may further include step 407, in which the control circuit 111 identifies one or more empty pixels from the third set of pixels. Each empty pixel of the one or more empty pixels may be a pixel of the first depth map that, before the first depth map is updated based on depth values of the second depth map, has no depth value assigned to the pixel. In the example depicted in FIGS. 6C-6F, the control circuit 111 may identify the one or more empty pixels as pixels with the following pixel coordinates: $[5, 9]^T$, $[5, 12]^T$ (see FIG. 6D), $[8, 3]^T$, and $[8, 6]^T$ (see FIG. 6E). More specifically, before the first depth map is supplemented with information from the second depth map, these pixels have no depth value assigned to them. In some implementations, the one or more empty pixels in this example may be identified as an intersection of the set of empty pixels depicted in FIG. 6A and the third set of pixels identified in step 405.

Returning to FIG. 4, the method 400 may further include step 409, in which the control circuit 111 updates the first depth map by assigning to each empty pixel of the one or more empty pixels a respective depth value that is based on a depth value of a corresponding pixel of the second set of pixels of the second depth map. The corresponding pixel for the empty pixel may be a pixel of the second set of pixels of the second depth map that represent a same physical location as the empty pixel. The depth value assigned to a particular empty pixel may be relative to the first camera 540. For instance, the depth value may indicate a distance along a coordinate axis (e.g., Z-axis) of a coordinate system of the first camera 540, wherein the distance is between the first camera 540 and a physical location represented or to be represented by the empty pixel. In some cases, the depth value assigned to the empty pixel may be based on the depth value of the corresponding pixel of the second depth map and based on the transformation function which defines a spatial relationship between the cameras 540/550. For instance, the depth value assigned to the empty pixel may be Z', which is determined based on $T_{First}^{Second}$ and based on the depth value Z of the corresponding pixel of the second depth map, as described above. In some cases, the one or more empty pixels may be referred to as one or more updated pixels after they are assigned with respective depth values, wherein each updated pixel of the one or more updated pixels is considered to have belonged to the one or more empty pixels. In an embodiment, the non-empty pixels of the first depth map 682 (e.g., the first set of pixels in FIG. 6A) are ignored by the control circuit 111 in step 409.

Figure 6G:
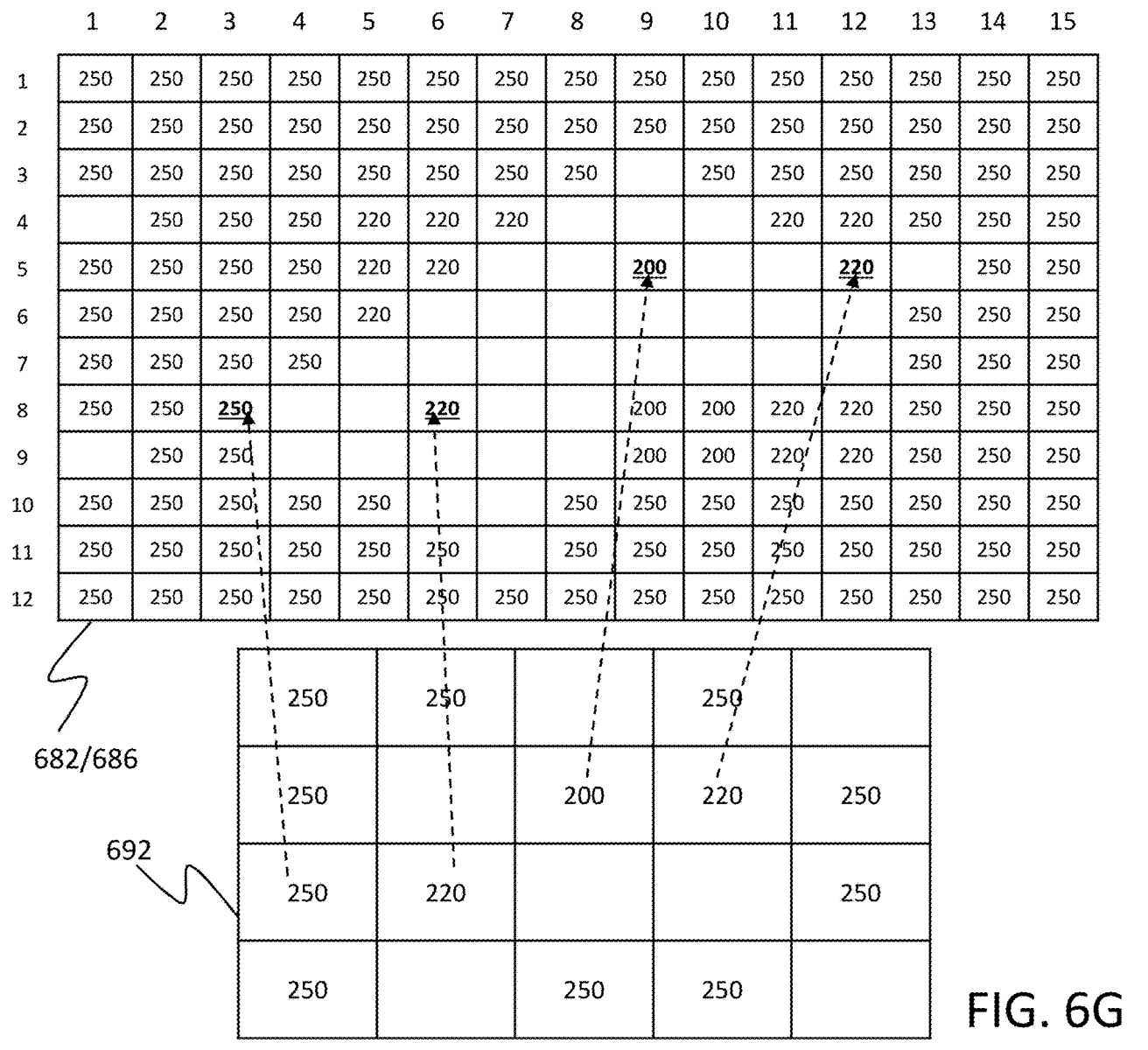

FIG. 6G illustrates an example of an updated version of the first depth map 682 (also referred to as an updated first depth map 686). The updated first depth map 686 may be generated by assigning, to the empty pixels, such as $[5, 9]^T$, $[5, 12]^T$, $[8, 3]^T$, and $[8, 6]^T$ of the first depth map 682, respective depth values equal to or based on depth values of corresponding pixels of the second depth map 692. The corresponding pixels in this example are $[2, 3]^T$, $[2, 4]^T$, $[3, 1]^T$, and $[3, 2]^T$ of the second depth map 692, respectively. As shown in FIG. 6G, the depth values assigned to the empty pixels of the first depth map 682 are expressed as a bold underlined numbers. The depth values assigned to the empty pixels $[5, 9]^T$, $[5, 12]^T$, $[8, 3]^T$, and $[8, 6]^T$ of the first depth map 682 may indicate respective depth values relative to the first camera 540 (of FIGS. 5A and 5B) for respective physical locations represented by these pixels.

In the example of FIG. 6G, the respective depth values assigned to the one or more empty pixels $[5, 9]^T$, $[5, 12]^T$, $[8, 3]^T$, and $[8, 6]^T$ of the first depth map 682 may equal the corresponding depth values of the second depth map 692. For instance, the depth value of 200 cm assigned to the empty pixel $[5, 9]^T$ of the updated first depth map 686 is equal to a corresponding depth value of 200 cm assigned to the corresponding pixel $[2, 3]^T$ of the second depth map 692. This example may reflect a situation in which a coordinate system of the first camera 540 and a coordinate system of the second camera 550 (of FIGS. 5A and 5B) share a common definition for what constitutes Z=0. Such a situation may occur, for instance, when the first camera 540 and the second camera 550 are attached to a common camera mount (e.g., 530 of FIG. 5B) that causes the two cameras 540, 550 to share a common depth relative to objects in their respective fields of view 580, 590.

In another example, the respective depth value for each empty pixel of the one or more empty pixels may be different from a depth value of a corresponding pixel in the second depth map 692. As stated above, the depth value Z' assigned to the empty pixel may more generally be based on the transformation function $$T_{First}^{Second},$$

based on the following:

$$\begin{bmatrix} X' \\ Y' \\ Z' \\ 1 \end{bmatrix}_{First} = T_{First}^{Second} \begin{bmatrix} X \\ Y \\ Z \\ 1 \end{bmatrix}_{Second} \quad \text{Equation 5}$$

In an embodiment, the control circuit in step 409 may further up-sample the depth values assigned to the empty pixels of the first depth map 682 when the first depth map 682 has a higher resolution than a resolution of the second depth map 692. For instance, FIG. 6G illustrates a situation in which the first depth map 682 has a resolution of 12×15 pixels to cover a first camera field of view 580 of the first camera 540, and the second depth map 692 has a resolution of 4×5 pixels to cover a second camera field of view 590 of the second camera 550. Assuming that the first camera field of view 580 has substantially the same size as the second camera field of view 590, the first depth map 682 in the example of FIG. 6G has a higher resolution than the second depth map 692 of FIG. 6G.

In some instances, up-sampling may be performed so as to populate a greater number of empty pixels in the first depth map 682 with depth values. For instance, FIG. 6G depicts an example in which up-sampling has not yet been performed. In this example, four empty pixels in the first depth map 682 have been updated (and thus converted to updated pixels) based on corresponding depth values from the second depth map 692. However, FIG. 6G illustrates a situation in which a total number of empty pixels in the first depth map 682 is about ten times higher, and in which a total number of all pixels in the first depth map 682 (180 pixels) is about 45 times higher. Although assigning depth values to the four empty pixels of FIG. 6G increases an amount of depth information in the first depth map, this increase may be small relative to an overall size of the first depth map 682. Thus, in order to increase the amount of depth information in the first depth map 682 by a greater amount, up-sampling may be performed on the depth values assigned to the empty pixels of FIG. 6G.

Figure 6H:
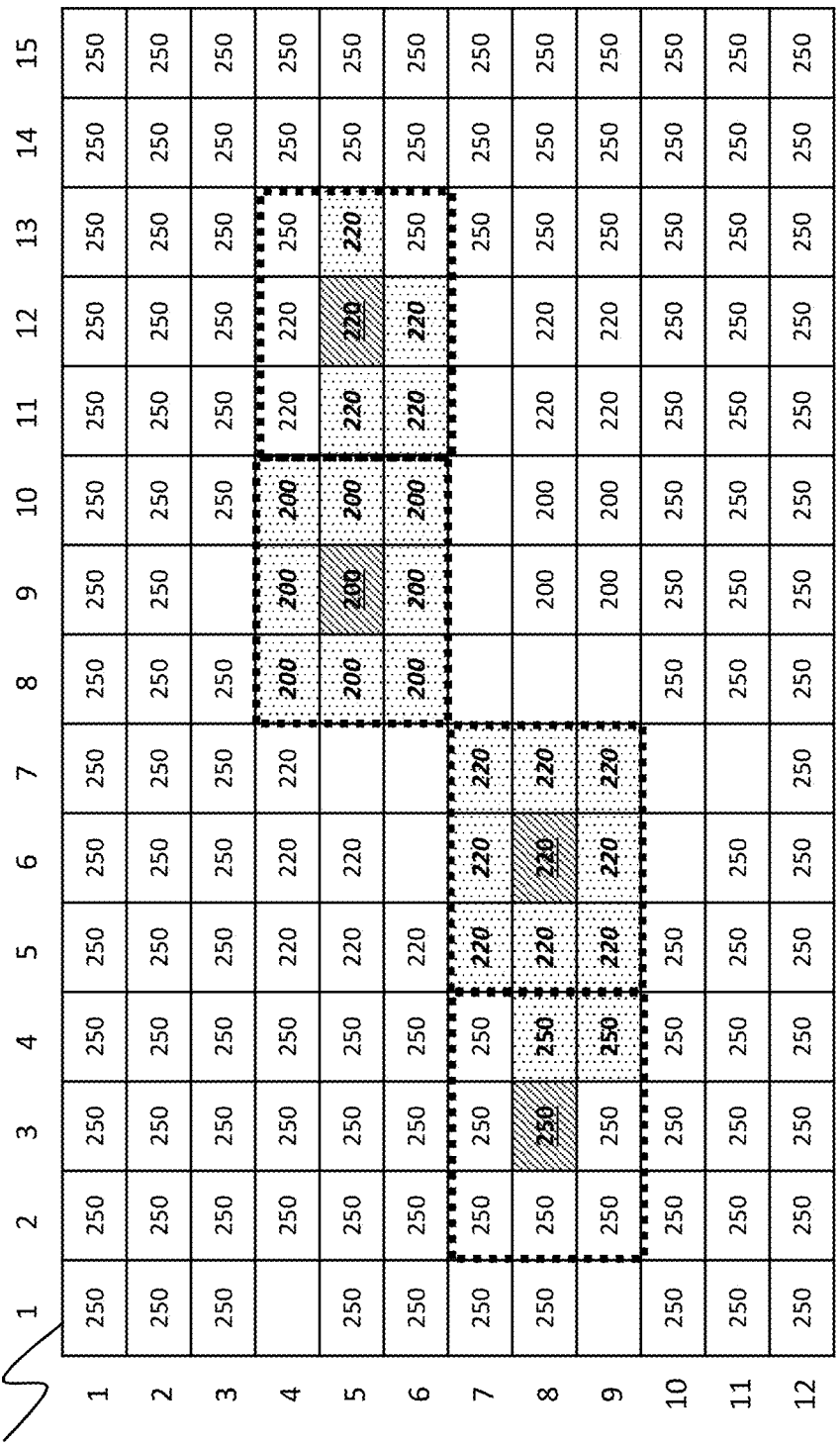

In an embodiment, the control circuit 111 may perform the up-sampling by: identifying, for at least one pixel that belongs or belonged to the one or more empty pixels of step 407, a respective set of one or more adjacent empty pixels of the first depth map 682 which are adjacent (e.g., immediately adjacent) to the at least one pixel and for which no depth values have been assigned to them. In this example, the at least one pixel may be any one of pixels $[8, 3]^T$, $[8, 6]^T$, $[5, 9]^T$, and $[5, 12]^T$, which were identified in step 407. These pixels may be referred to as an initial set of empty pixels. FIG. 6H depicts an example in which pixels $[8, 4]^T$ and $[9, 4]^T$ are determined as adjacent empty pixels for a first pixel $[8, 3]^T$ that belonged or belongs to one of the initial set of empty pixels. The first pixel $[8, 3]^T$ may have already been updated with the depth value of, e.g., 250 cm (such that the first pixel is an updated pixel that belonged to the initial set of empty pixels), or may not have been updated yet (such that the first pixel belongs to the initial set of empty pixels). The figure further depicts the adjacent empty pixels for a second pixel $[8, 6]^T$, third pixel $[5, 9]^T$, and fourth pixel $[5, 12]^T$ that each belonged or belongs to the initial set of empty pixels. As depicted in FIG. 6H, the control circuit 111 may perform the up-sampling by further assigning the depth value of the at least one empty pixel (e.g., the first pixel $[8, 3]^T$) to the respective set of one or more adjacent empty pixels. The depth value may have already been assigned to the at least one empty pixel (e.g., the first pixel $[8, 3]^T$), or is about to be assigned to the at least empty pixel. More specifically, FIG. 6H depicts respective depth values that were assigned or are to be assigned to the initial set of empty pixels $[8, 3]^T$, $[8, 6]^T$, $[5, 9]^T$, and $[5, 12]^T$ (which in this example are 250 cm, 220 cm, 200 cm, and 220 cm, respectively) also being assigned to the respective sets of adjacent empty pixels. In an embodiment, the up-sampling described above may be performed for each pixel that belonged or belongs to the initial set of empty pixels.

In an embodiment, the control circuit 111 may identify the respective set of one or more adjacent empty pixels as all empty pixels and/or only empty pixels in a region of pixels surrounding the at least one pixel. In such an embodiment, the control circuit 111 may be configured to determine a size of the region based on a ratio between a resolution of the first depth map 682 and a resolution of the second depth map 692. For instance, if the first depth map 682 has a resolution of "g×h" pixels, and the second depth map 692 has a resolution of "m×n" pixels, the size of the region may be equal to or otherwise based on "q×r" pixels, wherein "q" is a nearest integer to the ratio "g/m," and "r" is a nearest integer to the ratio "h/r." As an example, FIGS. 6A through 6H illustrate the first depth map 682 having a resolution of 12×15 pixels, and the second depth map 692 having a resolution of 4×5 pixels. In FIG. 6H, a region of adjacent pixels surrounding one of the initial empty pixel is enclosed by solid dashed lines. In this example, the at least one empty pixel may be any of the original empty pixels $[8, 3]^T$, $[8, 6]^T$, $[5, 9]^T$, and $[5, 12]^T$, and the size of the region that defines what are considered adjacent empty pixels may be equal to 12/4×15/5 pixels (i.e., 3×3 pixels). In other words, the control circuit 111 in this example may determine all empty pixels within a 3×3 region centered around a first pixel of the initial set of empty pixels to be adjacent empty pixels for the first pixel. In some cases, all empty pixels which fall outside the 3×3 region are not considered to be adjacent to the first pixel.

In an embodiment, a size of the region of adjacent empty pixels may be greater than or less than a ratio between a resolution of the first depth map and a resolution of the second depth map. For example, FIG. 6I depicts an example in which the size of the region is 5×5. That is, the control circuit 111 in this example may identify adjacent empty pixels, for a particular pixel belonging or having belonged to the initial set of empty pixels, as all empty pixels (and only those empty pixels) which are in a 5×5 region of pixels surrounding the particular pixel.

FIG. 6I further depicts an example in which the control circuit 111 may consider some empty pixels to be adjacent to multiple pixels of the initial set of empty pixels. In some cases, the multiple pixels may have already been assigned depth values, and thus may be referred to as updated pixels. FIG. 6I involves a situation having a first updated pixel $[8, 3]^T$ assigned with a first depth value (e.g., 250 cm) and a second updated pixel $[8, 6]^T$ assigned with a second depth value (e.g., 220 cm). The control circuit 111 in this example may update the first depth map 682 further by identifying a set of one or more adjacent empty pixels that are adjacent to the first updated pixel $[8, 3]^T$ and the second updated pixel $[8, 6]^T$. In this example, the control circuit 111 may consider all empty pixels within a first 5×5 region surrounding the first updated pixel $[8, 3]^T$ or a second 5×5 region surrounding the second updated pixel $[8, 6]^T$ to be adjacent empty pixels for the first updated pixel $[8, 3]^T$ or the second updated pixel $[8, 6]^T$, respectively. Based on this criterion, some empty pixels may be considered adjacent to both the first updated pixel $[8, 3]^T$ and adjacent to the second updated pixel $[8, 6]^T$. In such an example, the control circuit 111 in step 409 may perform up-sampling by further identifying pixels (e.g., $[7, 5]^T$, $[8, 4]^T$, $[8, 5]^T$, $[9, 4]^T$, and $[9, 5]^T$) as being adjacent empty pixels to both the first updated pixel $[8, 3]^T$ and to the second updated pixel $[8, 6]^T$. In such an instance, the control circuit 111 may assign to those adjacent empty pixels an average depth value (e.g., 235 cm) that is an average of the first depth value (e.g., 250 cm) assigned to the first updated pixel and the second depth value (e.g., 220 cm) assigned to the second updated pixel. Similarly, pixels $[6, 7]^T$, $[6, 8]^T$, $[6, 7]^T$, $[6, 8]^T$ in the example of FIG. 6I may be considered adjacent to both the second updated pixel $[8, 6]^T$ and a third updated pixel $[5, 9]^T$, and may be assigned an average depth value of 210 cm. The example in FIG. 6I may similarly apply to pixels $[4, 10]^T$, $[5, 10]^T$, $[5, 11]^T$, $[6, 10]^T$, $[6, 11]^T$, $[7, 10]^T$, $[7, 11]^T$, which may be considered adjacent to both the third updated pixel $[5, 9]^T$ and a fourth updated pixel $[5, 12]^T$.

In an embodiment, the control circuit 111 may update the first depth map 682 further by identifying a first set of adjacent empty pixels that are adjacent to the first updated pixel and not adjacent to any other updated pixel of the one or more updated pixels, and assigning the first depth value to the first set of adjacent empty pixels. For instance, the control circuit 111 in the example of FIG. 6I may identify pixel $[9, 1]^T$ as being adjacent to the first updated pixel $[8, 3]^T$ and not adjacent to any other updated pixel of the one or more updated pixels (not considered to be adjacent to pixels $[8, 6]^T$, $[5, 9]^T$, $[5, 12]^T$), and may assign to that adjacent empty pixel the depth value (e.g., 250 cm) of the first updated pixel $[8, 3]^T$. While the above steps described with respect to FIG. 6I are performed for a first updated pixel and a second updated pixel, they may more generally be performed for a first pixel and a second pixel that each belongs or belonged to the initial set of empty pixels.

Figures 7A, 7B:
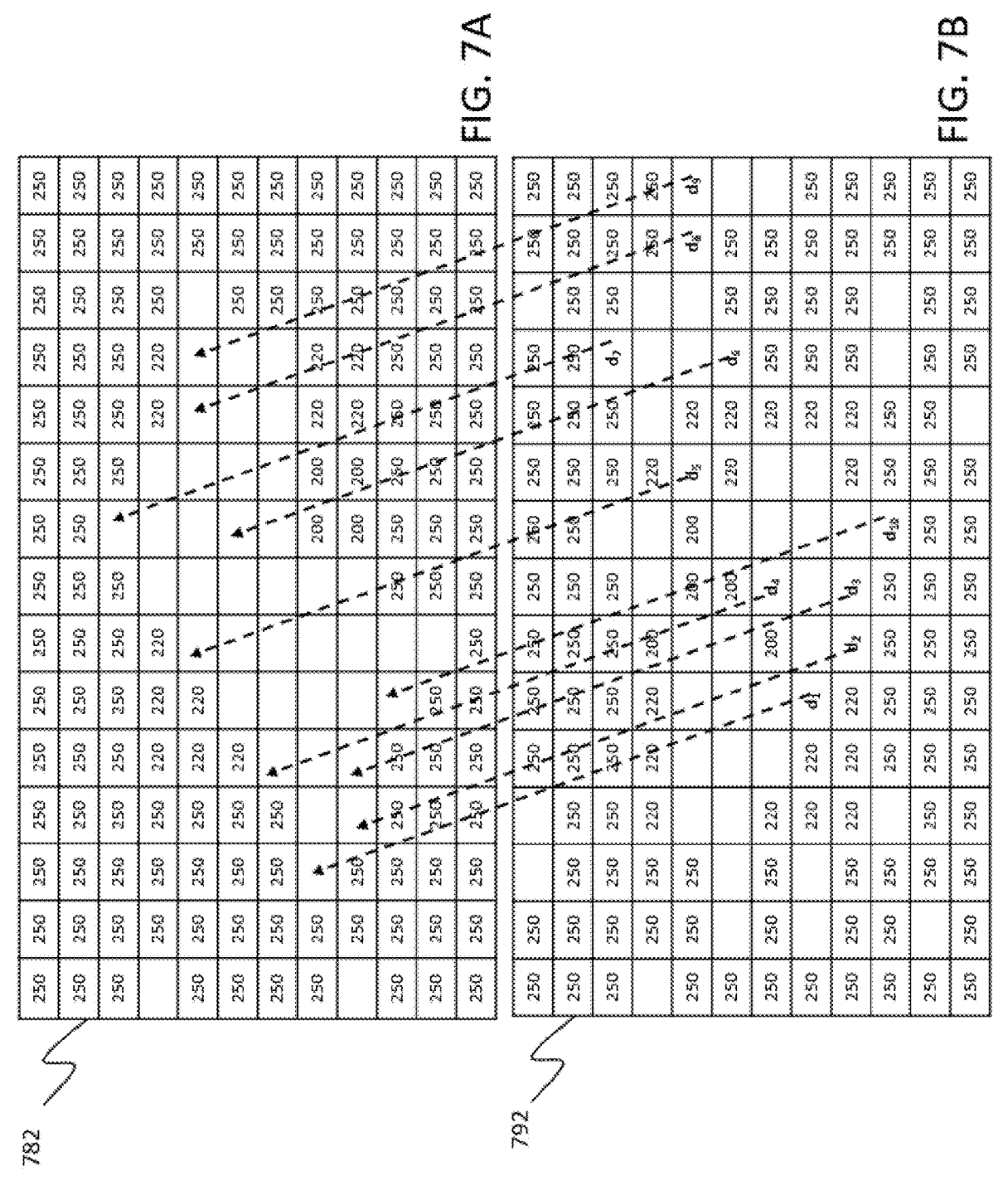
Figure 7C:
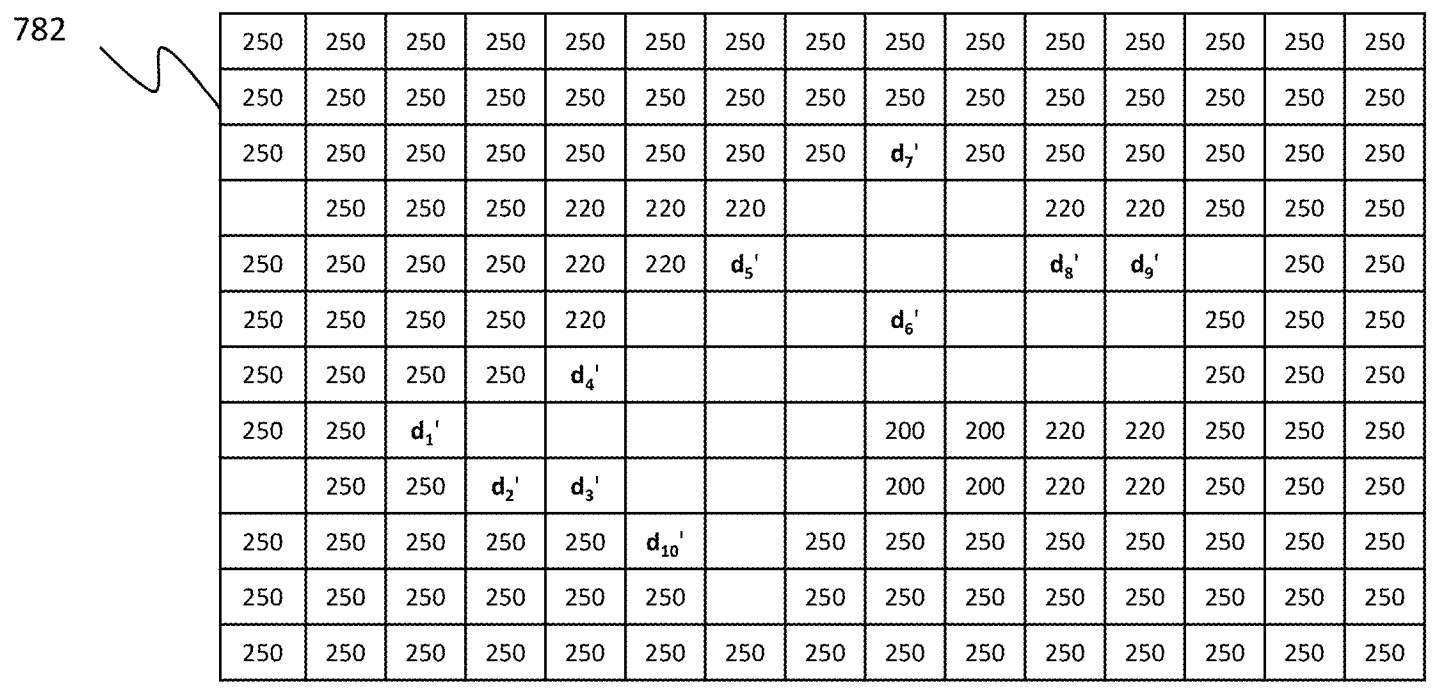

FIGS. 7A-7C depict an example in which a first depth map 782 and a second depth map 792 have the same resolution. In such a situation, the up-sampling described above may be omitted. In an embodiment, the control circuit 111 may update the first depth map 782 by assigning to one or more empty pixels of the first depth map 782 respective depth values based on depth information in the second depth map 792. The control circuit 111 may identify the one or more empty pixels to update in the first depth map 782 in a manner similar to that described above with respect to, e.g., steps 401-407. For instance, FIGS. 7A and 7B depict the control circuit identifying a plurality of empty pixels in the first depth map 782 (identified by the dotted arrows), wherein the empty pixels in the first depth map correspond to an equal number of pixels in the second depth map having depth values $d_1$ through $d_{10}$. As illustrated in FIGS. 7A and 7B, there may be an offset (also referred to as a translation) between the plurality of empty pixels of the first depth map 782 and the corresponding pixels of the second depth map 792 because the two depth maps 782, 792 are generated from two cameras that are at different respective locations, and thus have different fields of view. In other words, the two cameras may be offset relative to each other, and thus cause a pixel in the first depth map 782 to be offset relative to a corresponding pixel in the second depth map 792.

In an embodiment, the control circuit 111 may further assign respective depth values to the empty pixels in the first depth map 782 in a manner similar to that described above with respect to step 409. For instance, FIG. 7C illustrates the empty pixels of the first depth map 782 being assigned respective depth values $d_1'$ through $d_{10}'$, which are based on the depth values $d_1$ through $d_{10}$ of the second depth map.

In an embodiment, the first depth map may have a first resolution lower than a second resolution of the second depth map such that each pixel of the third set of pixels of the first depth map in step 407 corresponds to multiple pixels of the second set of pixels of the second depth map. In such an embodiment, the control circuit 111 may perform the updating of the first depth map (e.g., in step 409) by determining the respective depth value to assign to each empty pixel of the one or more empty pixels of step 407 as an average of the respective depth values of corresponding pixels of the second set of pixels of the second depth map, or as an average based on the respective depth values of corresponding pixels of the second set of pixels of the second depth map.

Figures 8A, 8B:
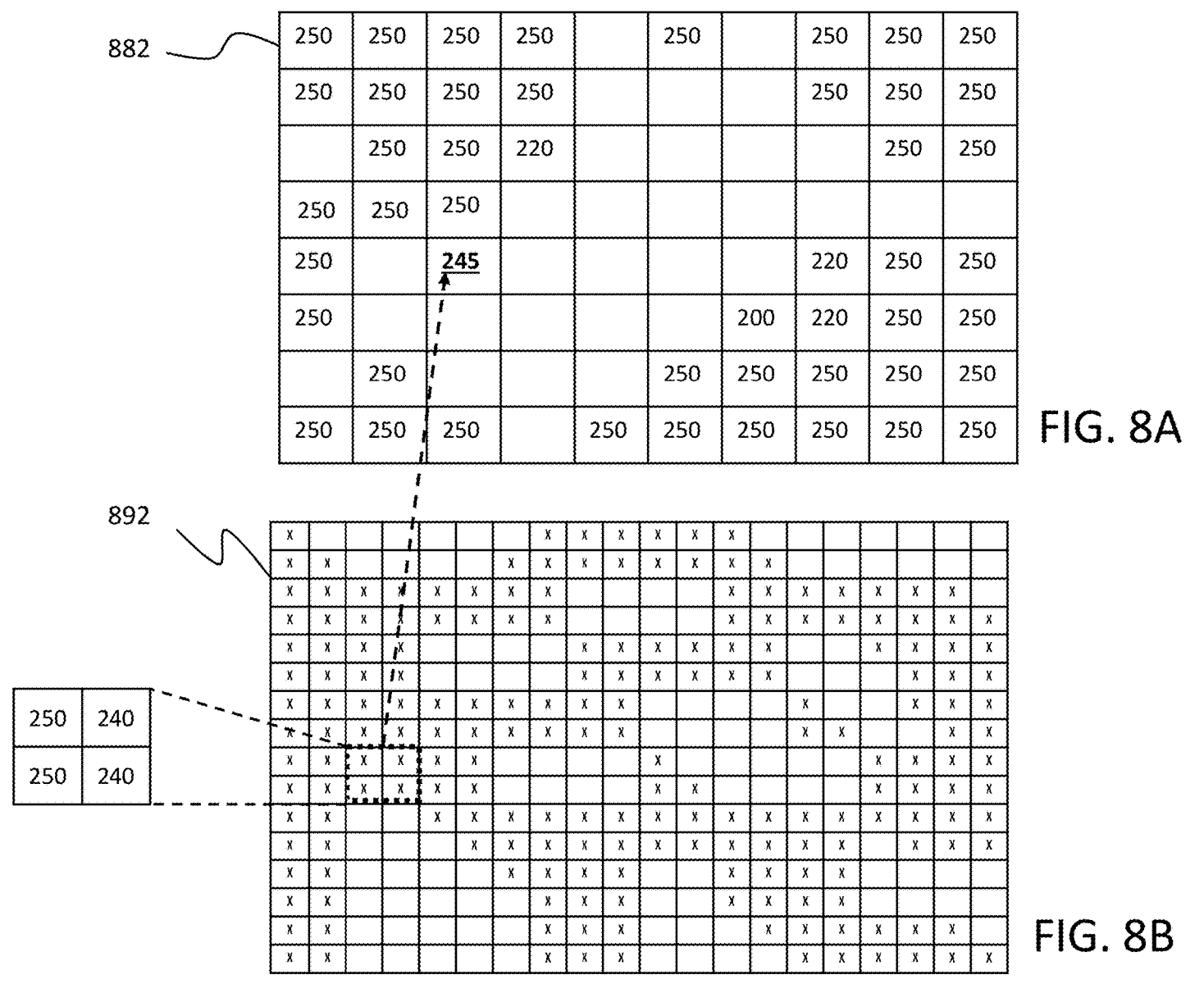

FIG. 8A is an example diagram showing a first depth map 882 having a resolution of 8×10 pixels and FIG. 8B is an example diagram showing a second depth map 892 having a higher resolution of 16×20 pixels. In the example shown in FIGS. 8A and 8B, because the resolution of the second depth map 892 is higher than the resolution of the first depth map 882, down-sampling may be performed. The down-sampling may be needed because, multiple pixels in the second depth map 892 may correspond to the same pixel of the first depth map 882.

For instance, FIG. 8B depicts the second depth map 892 with "X" representing pixels having depth values. The figure illustrates one group of four pixels, which are denoted by a dotted box, in the second depth map 892 of FIG. 8B corresponding to a single pixel in the first depth map 882 of FIG. 8A. In one example, the four pixels in the dotted box of FIG. 8B may have coordinates of, e.g., $[9, 3]^T$, $[9, 4]^T$, $[10, 3]^T$, $[10, 4]^T$. When the calculation discussed above with respect to step 405 is used to determine pixel coordinates $[a, b]^T$ of corresponding pixels in the first depth map 882, the calculation may yield values that all round to the same integers. For example, the calculation may yield, e.g., pixel coordinates of $[5.1, 3.1]^T$, $[5.1, 3.2]^T$, $[5.3, 3.1]^T$, and $[5.3, 3.2]^T$ before the coordinates are rounded to the nearest integer. When these coordinates are rounded, they may all round to pixel $[5, 3]^T$ of the first depth map 882. Thus, the four pixels in the dotted box of the second depth map 892 of FIG. 8B may all correspond to pixel $[5, 3]^T$ in the first depth map 882. As illustrated in FIGS. 8A and 8B, there may be an offset (also referred to as a translation) between an empty pixel (e.g., $[5, 3]^T$) of the first depth map 882 and corresponding pixels ($[9, 3]^T$, $[9, 4]^T$, $[10, 3]^T$, $[10, 4]^T$) of the second depth map 892 because the two depth maps 882, 892 are generated from two cameras that are at different respective locations, and thus have different fields of view.

In an embodiment, the down-sampling may be performed by assigning to an empty pixel of the first depth map 882 an average of respective depth values of the multiple pixels of the second depth map 892 that correspond to the empty pixel. For instance, FIG. 8A depicts an example in which the empty pixel $[5, 3]^T$ in the first depth map 882 is assigned an average of the respective depth values (e.g., 250 cm, 250 cm, 240 cm, 240 cm) of the corresponding pixels of the second depth map 892.

In an embodiment, the down-sampling may involve assigning to an empty pixel of the first depth map 882 an average that is based on respective depth values of the multiple pixels of the second depth map 892 that correspond to the empty pixel. For instance, the control circuit 111 may be configured to determine a plurality of intermediate depth values based on the respective depth values of the multiple pixels of the second depth map 892 that correspond to the empty pixel. The intermediate depth values (e.g., Z') may be determined based on the respective depth values (e.g., Z) of the corresponding pixels of the second depth map 892, and based on a transformation function that describes a relationship between the first camera (e.g., 540 of FIG. 5A/5B) and the second camera (e.g., 550 of FIG. 5A/5B), based on the following relationship, which was described above with respect to step 409 and step 405:

$$\begin{bmatrix} X' \\ Y' \\ Z' \\ 1 \end{bmatrix}_{First} = T_{First}^{Second} \begin{bmatrix} X \\ Y \\ Z \\ 1 \end{bmatrix}_{Second} \quad \text{Equation 6}$$

In the above example involving pixels $[9, 3]^T$, $[9, 4]^T$, $[10, 3]^T$, $[10, 4]^T$ of the second depth map 892 of FIG. 8B, the control circuit 111 may determine four respective intermediate depth values based on the above relationship. In this embodiment, the control circuit 111 may assign to the empty pixel $[5, 3]^T$ of the first depth map 882 an average of the four intermediate depth values.

In an embodiment, the above example may involve only non-empty pixels of the second depth map 892. More specifically, the down-sampling may involve assigning to an empty pixel of the first depth map 882 an average that is based on respective depth values of non-empty pixels of the second depth map 892 that correspond to the empty pixel. For instance, if pixel $[9, 3]^T$ in the second depth map 892 were instead an empty pixel, then the empty pixel $[5, 3]^T$ in the first depth map 882 would correspond to the following non-empty pixels in the second depth map 892: $[9, 4]^T$, $[10, 3]^T$, $[10, 4]^T$. This example would involve determining three respective intermediate depth values based on depth values of the three non-empty corresponding pixels ($[9, 4]^T$, $[10, 3]^T$, $[10, 4]^T$) of the second depth map 892, and assigning to the empty pixel $[5, 3]^T$ an average of the three intermediate depth values.

In an embodiment, the control circuit 111 may be configured to perform back-projection to determine a 3D coordinate of a physical location, wherein the 3D coordinate may be included in a point cloud. In an embodiment, the back-projection may be performed for at least one pixel or for each pixel that belonged to or belongs to the one or more pixels of step 407 of FIG. 4. In an embodiment, the control circuit 111 may perform the back-projection by determining a respective center location of a pixel that belonged or belongs to the one or more empty pixels, and by determining, as a respective coordinate of a physical location represented by the pixel, a 3D coordinate that projects onto the center location of the pixel and for which a component of the 3D coordinate is equal to a depth value assigned or to be assigned to the pixel. In some cases, the control circuit 111 may be configured to generate a point cloud that includes or is otherwise based on the respective 3D coordinate. In some implementations, the point cloud may be generated based on the respective 3D coordinate by assigning the 3D coordinate as a value or set of values to a pixel of a depth map, such that the depth map also acts as the point cloud or part of the point cloud, and the 3D coordinate is part of the point cloud.

Figure 9A:
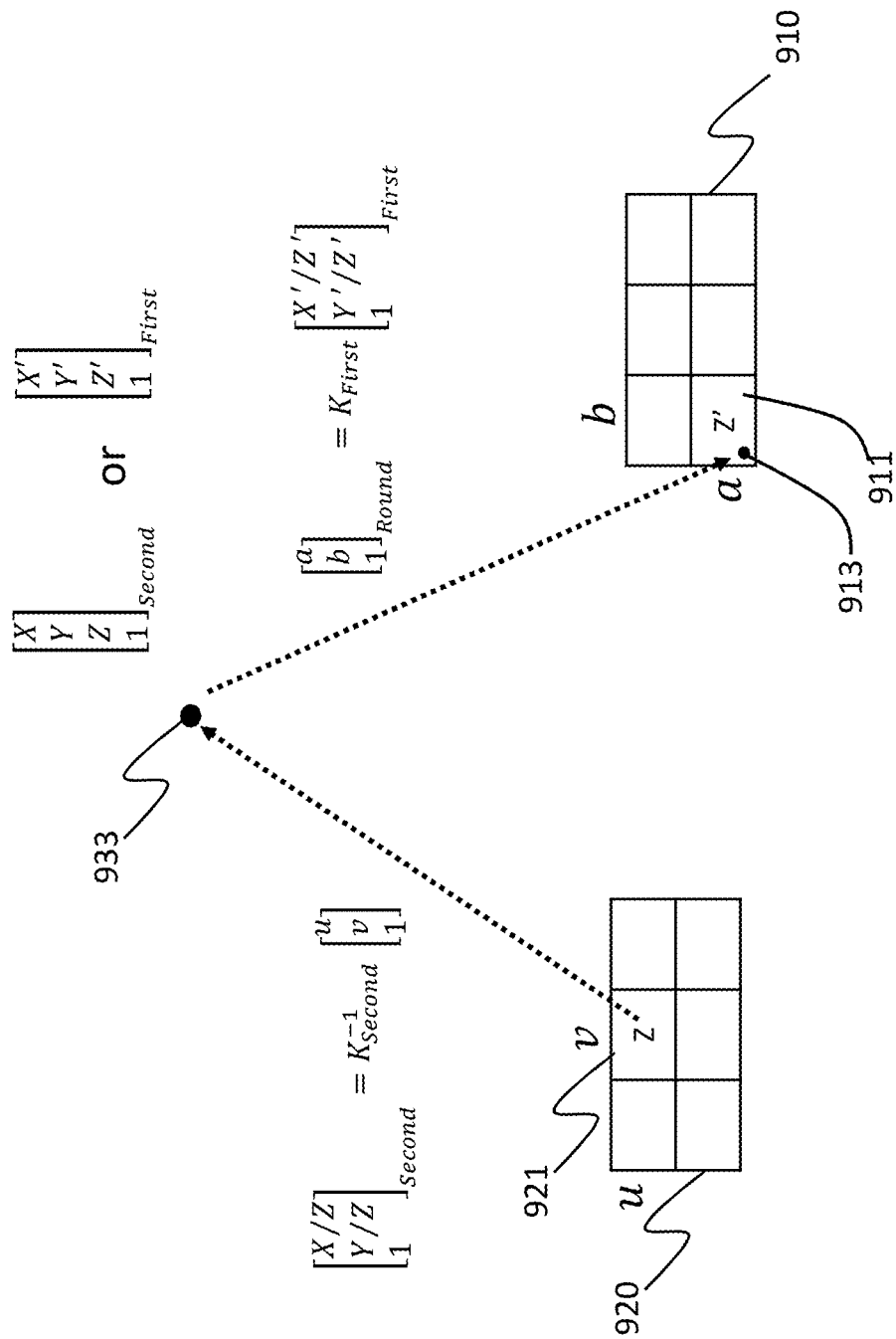
FIGS. 9A through 9C illustrate an example of determining a coordinate of a physical location through a back-projection operation, according to an embodiment herein.

In some cases, the back-projection may be performed for a situation in which a pixel of the second depth map (e.g., 692 of FIG. 6B) represents a physical location that may not necessarily project to a center location of a corresponding pixel of the first depth map (e.g., 682 of FIG. 6A). The center location of a pixel may refer to a center location of a region on an image sensor (e.g., 143) that corresponds to the pixel (the image sensor may also be referred to as a camera sensor). For instance, FIG. 9A depicts six regions on a first image sensor (e.g., the camera sensor 143 of FIG. 1C) that sense information for a first depth map, and six regions on a second image sensor (e.g., the camera sensor 153 of FIG. 1D) that sense information for a second depth map. Each region may be a region occupied by, e.g., a respective sensor of a sensor array (e.g., array of photodetectors) that forms the image sensor. As depicted in FIG. 9A, region 921 for an image sensor 920 may correspond with a pixel $[u\ v]^T$ of the second depth map (the image sensor 920 may be an embodiment of the camera sensor 153). As discussed above with respect to step 405, the pixel $[u\ v]^T$ may represent a physical location 933 that has a coordinate of $[X\ Y\ Z]^T$ in a coordinate system of the second camera (e.g., 150 of FIG. 1) or of the second depth map, and a coordinate of $[X'\ Y'\ Z']^T$ in a coordinate system of the first camera (e.g., 140 of FIG. 1) or of the first depth map. As also discussed above with respect to step 405 of FIG. 4, the coordinate $[X'\ Y'\ Z']^T$ may project to pixel $[a\ b]^T$ of the first depth map. More specifically, the coordinate $[X'\ Y'\ Z']^T$ may project to a location 913 within region 911 on an image sensor 910 (the image sensor 910 may be an embodiment of the camera sensor 143). The region 911 may correspond with a pixel $[a\ b]^T$ of the first depth map. The pixel $[a\ b]^T$ may, in an embodiment, be assigned a depth value of Z', as discussed above with respect to step 409.

In the above embodiment, although the coordinate $[X'\ Y'\ Z']^T$ can be included in a point cloud representing an object (e.g., object 260 of FIG. 2), doing so may not be optimal because the location 913 to which $[X'\ Y'\ Z']^T$ projects may not be a center location of the region 911. More specifically, the inclusion of $[X'\ Y'\ Z']^T$ in the point cloud may create problems because some processes that use the point cloud may rely on an assumption that the 3D coordinates in the point cloud project to respective center locations of corresponding pixels. Thus, the point cloud may need to instead include a 3D coordinate of a physical location which does project to a center location of the region 911. In an embodiment, such a 3D coordinate may be determined by using a back-projection operation.

Figure 9B:
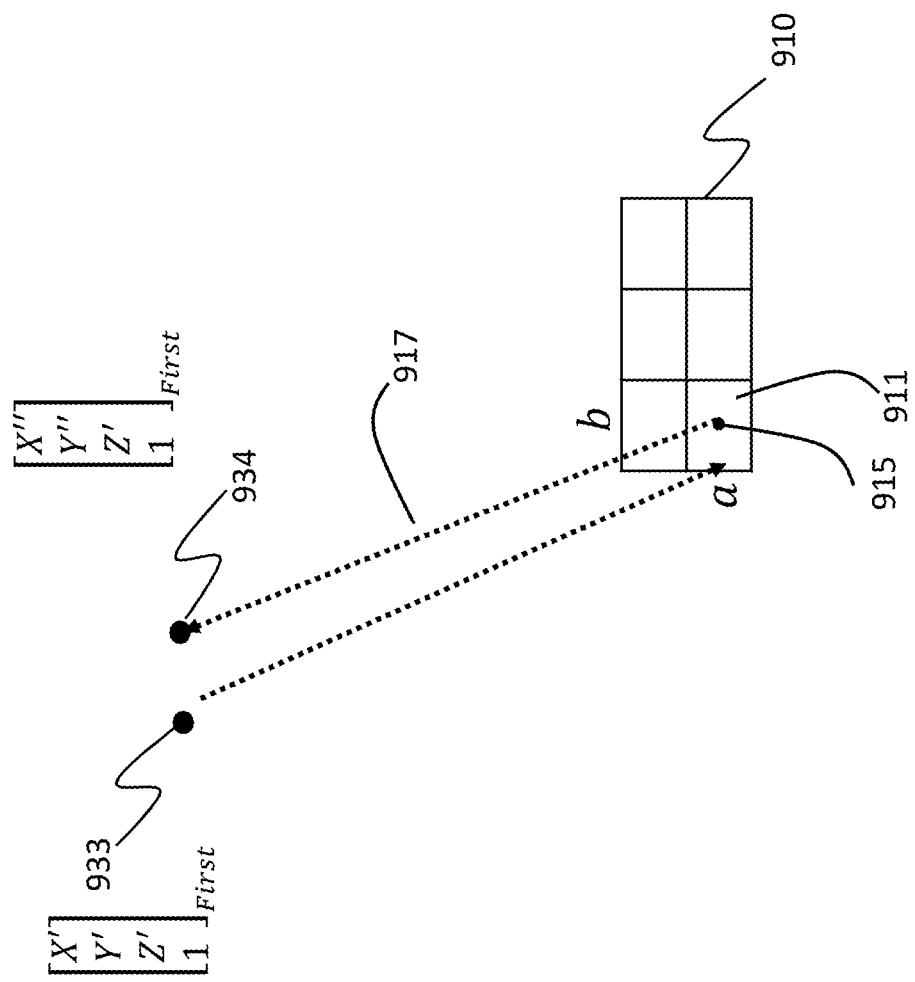
Figure 9C:
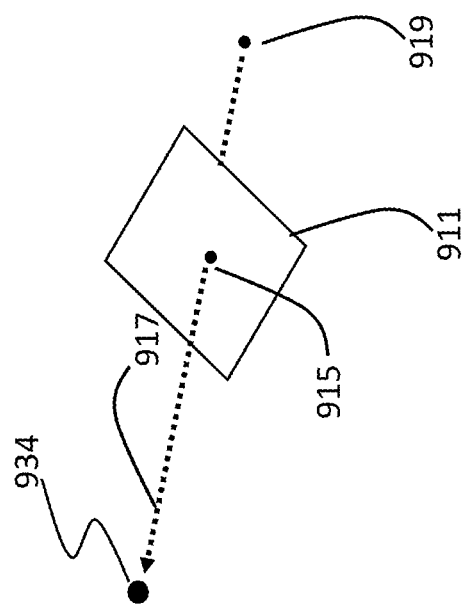

For instance, FIG. 9B depicts a scenario in which a 3D coordinate $[X''\ Y''\ Z'']^T$ is identified for a physical location 934 that does project to a center location 915 of the region 911 corresponding to pixel $[a\ b]^T$ (which may be referred to as a center location of the pixel). More specifically, the physical location 934 and its 3D coordinate $[X''\ Y''\ Z'']^T$ may be identified as a 3D coordinate which: falls on an imaginary line 917 that connects the center location 915 of the pixel $[a\ b]^T$ and a focal point 919 of the first camera (e.g., 140 of FIG. 1A). The imaginary line 917 is illustrated in both FIGS. 9B and 9C, while the focal point 919 is illustrated in FIG. 9C. Further, a Z component (i.e., Z''), or any other component that describes depth information, may have to be equal to a depth value assigned to the pixel $[a\ b]^T$. In other words, the value of Z'' is equal to the value of Z'. In an embodiment, once the 3D coordinate $[X''\ Y''\ Z'']^T$ of the physical location 934 is determined, this coordinate may be included in a point cloud in lieu of the 3D coordinate $[X'\ Y'\ Z']^T$ of the physical location 933. In some cases, the pixel $[a\ b]^T$ may be assigned not only the value Z'' (which is equal to Z'), but also the values X'' and Y'', such that the pixel $[a\ b]^T$ is assigned the 3D coordinate $[X'\ Y'\ Z']^T$. Assigning the 3D coordinate to the pixel may be one way to generate a point cloud based on the 3D coordinate, in which a first depth map that includes the pixel $[a\ b]^T$ is the point cloud or part of the point cloud, wherein the point cloud includes 3D coordinates of physical locations on a surface of an object or structure.

ADDITIONAL DISCUSSION OF VARIOUS EMBODIMENTS

Embodiment 1 of the present disclosure relates to a camera image processing system, comprising a communication interface and a control circuit. The communication interface is configured to communicate with: (i) a first camera that is a first type of depth-sensing camera and having a first camera field of view, and (ii) a second camera that is a second type of depth-sensing camera different from the first type of depth-sensing camera and having a second camera field of view which overlaps with the first camera field of view. The control circuit is configured, when the communication interface is in communication with the first camera and the second camera to receive a first depth map that is generated based on information sensed by the first camera, wherein the first depth map includes a first set of pixels that represent a first set of respective physical locations in the first camera field of view and that indicate a first set of respective depth values for the first set of respective physical locations, wherein the first set of respective depth values are relative to the first camera. The control circuit is further configured to receive a second depth map that is generated based on information sensed by the second camera, wherein the second depth map includes a second set of pixels that represent a second set of respective physical locations in the second camera field of view and that indicate a second set of respective depth values for the second set of respective physical locations, wherein the second set of respective depth values are relative to the second camera. The control circuit is further configured to identify a third set of pixels of the first depth map that also represent the second set of respective physical locations, such that the third set of pixels correspond to the second set of pixels of the second depth map. The control circuit is further configured to identify one or more empty pixels from the third set of pixels, wherein each empty pixel of the one or more empty pixels is a pixel of the first depth map that has no depth value assigned to the pixel. The control circuit is further configured to update the first depth map by assigning to each empty pixel of the one or more empty pixels a respective depth value that is based on a depth value of a corresponding pixel of the second set of pixels of the second depth map, wherein the corresponding pixel for the empty pixel is a pixel of the second set of pixels of the second depth map that represents a same physical location as the empty pixel.

Embodiment 2 includes the camera image processing system of embodiment 1. In Embodiment 2, the control circuit is configured to determine the respective depth value to assign to each empty pixel of the set of one or more empty pixels based on the depth value of the corresponding pixel of the second depth map and based on a transformation function which defines the spatial relationship between the first camera and the second camera.

Embodiment 3 includes the camera image processing system of embodiment 2. In Embodiment 3, the second set of pixels of the second depth map has a set of respective pixel coordinates, and the control circuit is configured to identify the third set of pixels of the first depth map by determining an additional set of respective pixel coordinates based on the set of respective pixel coordinates and based on the transformation function which defines the spatial relationship between the first camera and the second camera, wherein the additional set of respective pixel coordinates identifies the third set of pixels.

Embodiment 4 includes the camera image processing system of any one of embodiments 1-3. In Embodiment 4, the control circuit is configured to receive the first depth map via the communication interface from the first camera, and to receive the second depth map via the communication interface from the second camera.

Embodiment 5 includes the camera image processing system of any one of embodiments 1-4. In Embodiment 5, the control circuit is configured, when the first depth map has a first resolution higher than a second resolution of the second depth map, to update the first depth map further by: identifying, for at least one pixel that belonged or belongs to the one or more empty pixels, a respective set of one or more adjacent empty pixels of the first depth map which are adjacent to the at least one pixel and which have no assigned depth value; and assigning to the respective set of one or more adjacent empty pixels a depth value that was assigned or is to be assigned to the at least one pixel.

Embodiment 6 includes the camera image processing system of embodiment 5. In Embodiment 6, the control circuit is configured to identify the respective set of one or more adjacent empty pixels as all empty pixels in a region of pixels surrounding the at least one pixel, wherein the control circuit is configured to determine a size of the region based on a ratio between a resolution of the first depth map and a resolution of the second depth map.

Embodiment 7 includes the camera image processing system of any one of embodiments 1-6. In Embodiment 7, the control circuit is configured to update the first depth map further by: identifying a set of one or more adjacent empty pixels that are adjacent to a first pixel that belonged or belongs to the one or more empty pixels, and adjacent to a second pixel that belonged or belongs to the one or more empty pixels; and assigning to the set of one or more adjacent empty pixels an average depth value that is an average of a first depth value that was assigned or is to be assigned to the first pixel, and of a second depth value that was assigned or is to be assigned to the second pixel.

Embodiment 8 includes the camera image processing system of embodiment 7. In Embodiment 8, the control circuit is configured to update the first depth map further by: identifying an additional set of adjacent empty pixels that are adjacent to the first pixel and not adjacent to any other pixel of the one or more empty pixels; and assigning the first depth value to the additional set of adjacent empty pixels.

Embodiment 9 includes the camera image processing system of any one of embodiments 1-8. In Embodiment 9, the control circuit is configured, for each pixel that belonged or belongs to the one or more empty pixels: to determine a respective center location of the pixel; to determine, as a respective coordinate of a physical location represented by the pixel, a 3D coordinate that projects onto the center location of the pixel and for which a component of the 3D coordinate is equal to a depth value assigned or to be assigned to the pixel; and to generate a point cloud based on the respective 3D coordinate.

Embodiment 10 includes the camera image processing system of embodiment 9. In Embodiment 10, the control circuit is configured to determine the respective 3D coordinate for each pixel that belonged or belongs to the one or more empty pixels as a coordinate which falls on an imaginary line running through: (i) the respective center location of the pixel and (ii) a focal point of the first camera.

Embodiment 11 includes the camera image processing system of any one of embodiments 1-4 or 7-10. In Embodiment 11, the control circuit is configured, when the first depth map has a first resolution lower than a second resolution of the second depth map such that each pixel of the one or more pixels of the first depth map corresponds to multiple pixels of the second set of pixels: to determine the respective depth value to assign to each empty pixel of the one or more empty pixels based on an average of respective depth values of corresponding pixels of the second set of pixels of the second depth map.

Embodiment 12 includes the camera image processing system of any one of embodiments 1-11. In Embodiment 11, the camera image processing system is part of a robot control system, and wherein when the communication interface is in communication with the first camera, the second camera, and a robot, the control circuit is configured: to generate, after the first depth map has been updated based on depth values of the second depth map, a robot movement command based on the first depth map; and to communicate the robot movement command via the communication interface to the robot.

Embodiment 13 includes the camera image processing system of embodiment 12. In Embodiment 13, the control circuit is configured, after the first depth map has been updated based on depth values of the second depth map: to generate the robot movement command based on the first depth map.

Embodiment 14 of the present disclosure relates to a non-transitory computer-readable medium having instructions that, when executed by a control circuit of a camera image processing system, causes the control circuit: to receive a first depth map, wherein the first depth map is received from the non-transitory computer-readable medium of the camera image processing system, or via a communication interface of the camera image processing system, wherein the communication interface is configured to communicate with a first camera that is a first type of depth-sensing camera and has a first camera field of view, and wherein the first depth map is generated based on information sensed by the first camera with which the communication interface is configured to communicate, and wherein the first depth map includes a first set of pixels that represent a first set of respective physical locations in the first camera field of view and that indicate a first set of respective depth values for the first set of respective physical locations, wherein the first set of respective depth values are relative to the first camera with which the communication interface is configured to communicate. The instructions further cause the control circuit to receive a second depth map, wherein the second depth map is received from the non-transitory computer-readable medium of the camera image processing system, or via the communication interface of the camera image processing system, wherein the communication interface is configured to communicate with a second camera that is a second type of depth-sensing camera different from the first type of depth-sensing camera and has a second camera field of view which overlaps with the first camera field of view, and wherein the second depth map is generated based on information sensed by the second camera with which the communication interface is configured to communicate, wherein the second depth map includes a second set of pixels that represent a second set of respective physical locations in the second camera field of view and that indicate a second set of respective depth values for the second set of respective physical locations, wherein the second set of respective depth values are relative to the second camera with which the communication interface is configured to communicate. The instructions further cause the control circuit to identify a third set of pixels of the first depth map that also represent the second set of respective physical locations, such that the third set of pixels correspond to the second set of pixels of the second depth map. The instructions further cause the control circuit to identify one or more empty pixels from the third set of pixels, wherein each empty pixel of the one or more empty pixels is a pixel of the first depth map that has no depth value assigned to the pixel. The instructions further cause the control circuit to update the first depth map by assigning to each empty pixel of the one or more empty pixels a respective depth value that is based on a depth value of a corresponding pixel of the second set of pixels of the second depth map, wherein the corresponding pixel for the empty pixel is a pixel of the second set of pixels of the second depth map that represents a same physical location as the empty pixel.

Embodiment 15 includes the non-transitory computer-readable medium of embodiment 14. In Embodiment 15, when the first depth map has a first resolution higher than a second resolution of the second depth map, the instructions further cause the control circuit: to identify, for at least one pixel that belonged or belongs to the one or more empty pixels, a respective set of one or more adjacent empty pixels of the first depth map which are adjacent to the at least one pixel and which have no assigned depth values; and to assign to the respective set of one or more adjacent empty pixels a depth value that was assigned or is to be assigned to the at least one pixel.

Embodiment 16 includes the non-transitory computer-readable medium of embodiment 15. In embodiment 16, the instructions cause the control circuit to identify the respective set of one or more adjacent empty pixels as all empty pixels in a region of pixels surrounding the at least one pixel, wherein the control circuit is configured to determine a size of the region based on a ratio between a resolution of the first depth map and a resolution of the second depth map.

Embodiment 17 includes the non-transitory computer-readable medium of any one of embodiments 14-16. In embodiment 17, the instructions further cause the control circuit to perform the following for each pixel that belonged or belongs to the one or more empty pixels: determining a respective center location of the pixel; determining, as a respective coordinate of a physical location represented by the pixel, a 3D coordinate that projects onto the center location of the pixel and for which a component of the 3D coordinate is equal to a depth value assigned or to be assigned to the pixel; and generating a point cloud based on the respective 3D coordinate.

Embodiment 18 of the present disclosure relates to a method of updating one or more depth maps. In Embodiment 18, the method comprises receiving a first depth map by a control circuit of a camera image processing system, wherein the first depth map is received from a non-transitory computer-readable medium of the camera image processing system, or via a communication interface of the camera image processing system, wherein the communication interface is configured to communicate with a first camera that is a first type of depth-sensing camera and has a first camera field of view, and wherein the first depth map is generated based on information sensed by the first camera with which the communication interface is configured to communicate, wherein the first depth map includes a first set of pixels that represent a first set of respective physical locations in the first camera field of view and that indicate a first set of respective depth values for the first set of respective physical locations, wherein the first set of respective depth values are relative to the first camera with which the communication interface is configured to communicate. The method further comprises receiving a second depth map, wherein the second depth map is received from the non-transitory computer-readable medium of the camera image processing system, or via the communication interface of the camera image processing system, wherein the communication interface is configured to communicate with a second camera that is a second type of depth-sensing camera different from the first type of depth-sensing camera and has a second camera field of view which overlaps with the first camera field of view, wherein the second depth map is generated based on information sensed by the second camera with which the communication interface is configured to communicate, wherein the second depth map includes a second set of pixels that represent a second set of respective physical locations in the second camera field of view and that indicate a second set of respective depth values for the second set of respective physical locations, wherein the second set of respective depth values are relative to the second camera with which the communication interface is configured to communicate. The method further comprises identifying a third set of pixels of the first depth map that also represent the second set of respective physical locations, such that the third set of pixels correspond to the second set of pixels of the second depth map. The method further comprises identifying one or more empty pixels from the third set of pixels, wherein each empty pixel of the one or more empty pixels is a pixel of the first depth map that has no depth value assigned to the pixel. The method further comprises updating the first depth map by assigning to each empty pixel of the one or more empty pixels a respective depth value that is based on a depth value of a corresponding pixel of the second set of pixels of the second depth map, wherein the corresponding pixel for the empty pixel is a pixel of the second set of pixels of the second depth map that represents a same physical location as the empty pixel.

Embodiment 19 includes method of embodiment 18. In Embodiment 19, the method the first depth map has a first resolution higher than a second resolution of the second depth map, and the method further comprises: identifying, for at least one pixel that belonged or belongs to the one or more empty pixels, a respective set of one or more adjacent empty pixels of the first depth map which are adjacent to the at least one pixel and which have no assigned depth values; and assigning to the respective set of one or more adjacent empty pixels a depth value that was assigned or is to be assigned to the at least one pixel.

Embodiment 20 includes the method of embodiment 19. In Embodiment 20, the method further comprises: identifying the respective set of one or more adjacent empty pixels as all empty pixels in a region of pixels surrounding the at least one pixel, wherein the control circuit is configured to determine a size of the region based on a ratio between a resolution of the first depth map and a resolution of the second depth map.

While various embodiments have been described above, it should be understood that they have been presented only as illustrations and examples of the present invention, and not by way of limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the appended claims and their equivalents. It will also be understood that each feature of each embodiment discussed herein, and of each reference cited herein, can be used in combination with the features of any other embodiment. All patents and publications discussed herein are incorporated by reference herein in their entirety.

What is claimed is:

1. A camera image processing system, comprising:
a communication interface configured to communicate with: (i) a first camera having a first camera field of view, and (ii) a second camera having a second camera field of view which overlaps with the first camera field of view; and
a control circuit configured, when the communication interface is in communication with the first camera and the second camera:
to receive a first depth map that is generated based on information sensed by the first camera, wherein the first depth map includes a first set of coordinates that represent a first set of respective physical locations in the first camera field of view and that indicate a first set of respective depth values for the first set of respective physical locations, wherein the first set of respective depth values are relative to the first camera;
to receive a second depth map that is generated based on information sensed by the second camera, wherein the second depth map includes a second set of coordinates that represent a second set of respective physical locations in the second camera field of view and that indicate a second set of respective depth values for the second set of respective physical locations, wherein the second set of respective depth values are relative to the second camera;
to identify a third set of coordinates of the first depth map that also represent the second set of respective physical locations, such that the third set of coordinates correspond to the second set of coordinates of the second depth map;
to identify one or more empty coordinates from the third set of coordinates, wherein each empty coordinate of the one or more empty coordinates is a coordinate of the first depth map that has no depth value assigned to the coordinate; and
to update the first depth map by assigning to each empty coordinate of the one or more empty coordinates a respective depth value that is based on a depth value of a corresponding coordinate of the second set of coordinates of the second depth map, wherein the corresponding coordinate for the empty coordinate is a coordinate of the second set of coordinates of the second depth map that represents a same physical location as the empty coordinate.

2. The camera image processing system of claim 1, wherein the control circuit is configured to determine the respective depth value to assign to each empty coordinate of the one or more empty coordinates based on the depth value of the corresponding coordinate of the second depth map and based on a transformation function which defines a spatial relationship between the first camera and the second camera.

3. The camera image processing system of claim 2, wherein the second set of coordinates of the second depth map has a set of respective coordinates, and wherein the control circuit is configured to identify the third set of coordinates of the first depth map by determining an additional set of respective coordinates based on the set of respective coordinates and based on the transformation function which defines the spatial relationship between the first camera and the second camera, wherein the additional set of respective coordinates identifies the third set of coordinates.

4. The camera image processing system of claim 1, wherein the control circuit is configured to receive the first depth map via the communication interface from the first camera, and to receive the second depth map via the communication interface from the second camera.

5. The camera image processing system of claim 1, wherein the control circuit is configured, when the first depth map has a first resolution higher than a second resolution of the second depth map, to update the first depth map further by:
identifying, for at least one coordinate that belonged or belongs to the one or more empty coordinates, a respective set of one or more adjacent empty coordinates of the first depth map which are adjacent to the at least one coordinate and which have no assigned depth value; and
assigning to the respective set of one or more adjacent empty coordinates a depth value that was assigned or is to be assigned to the at least one coordinate.

6. The camera image processing system of claim 5, wherein the control circuit is configured to identify the respective set of one or more adjacent empty coordinates as all empty coordinates in a region of coordinates surrounding the at least one coordinate, wherein the control circuit is configured to determine a size of the region based on a ratio between a resolution of the first depth map and a resolution of the second depth map.

7. The camera image processing system of claim 1, wherein the control circuit is configured to update the first depth map further by:
identifying a set of one or more adjacent empty coordinates that are adjacent to a first coordinate that belonged or belongs to the one or more empty coordinates, and adjacent to a second coordinate that belonged or belongs to the one or more empty coordinates; and
assigning to the set of one or more adjacent empty coordinates an average depth value that is an average of a first depth value that was assigned or is to be assigned to the first coordinate, and of a second depth value that was assigned or is to be assigned to the second coordinate.

8. The camera image processing system of claim 7, wherein the control circuit is configured to update the first depth map further by:

identifying an additional set of adjacent empty coordinates that are adjacent to the first coordinate and not adjacent to any other coordinate of the one or more empty coordinates; and assigning the first depth value to the additional set of adjacent empty coordinates.

9. The camera image processing system of claim 1, wherein the control circuit is configured, for each coordinate that belonged or belongs to the one or more empty coordinates:

to determine a respective center location of the coordinate;

to determine, a 3D coordinate that projects onto the center location of the coordinate and for which a component of the 3D coordinate is equal to a depth value assigned or to be assigned to the coordinate; and to generate a point cloud based on the respective 3D coordinate.

10. The camera image processing system of claim 9, wherein the control circuit is configured to determine the respective 3D coordinate for each coordinate that belonged or belongs to the one or more empty coordinates as a coordinate which falls on an imaginary line running through: (i) the respective center location of the coordinate and (ii) a focal point of the first camera.

11. The camera image processing system of claim 1, wherein the control circuit is configured, when the first depth map has a first resolution lower than a second resolution of the second depth map such that each coordinate of the first set of coordinates of the first depth map corresponds to multiple coordinates of the second set of coordinates:

to determine the respective depth value to assign to each empty coordinate of the one or more empty coordinates based on an average of respective depth values of corresponding coordinates of the second set of coordinates of the second depth map.

12. The camera image processing system of claim 1, wherein the camera image processing system is part of a robot control system, and wherein when the communication interface is in communication with the first camera, the second camera, and a robot, the control circuit is configured:

to generate, after the first depth map has been updated based on depth values of the second depth map, a robot movement command based on the first depth map; and to communicate the robot movement command via the communication interface to the robot.

13. The camera image processing system of claim 12, wherein the control circuit is configured, after the first depth map has been updated based on depth values of the second depth map: to generate the robot movement command based on the first depth map.

14. A non-transitory computer-readable medium having instructions that, when executed by a control circuit of a camera image processing system, causes the control circuit:

to receive a first depth map, wherein the first depth map is received from the non-transitory computer-readable medium of the camera image processing system, or via a communication interface of the camera image processing system, wherein the communication interface is configured to communicate with a first camera that has a first camera field of view, and wherein the first depth map is generated based on information sensed by the first camera with which the communication interface is configured to communicate, and wherein the first depth map includes a first set of coordinates that represent a first set of respective physical locations in the first camera field of view and that indicate a first set of respective depth values for the first set of respective physical locations, wherein the first set of respective depth values are relative to the first camera with which the communication interface is configured to communicate;

to receive a second depth map, wherein the second depth map is received from the non-transitory computer-readable medium of the camera image processing system, or via the communication interface of the camera image processing system, wherein the communication interface is configured to communicate with a second camera that has a second camera field of view which overlaps with the first camera field of view, and wherein the second depth map is generated based on information sensed by the second camera with which the communication interface is configured to communicate, wherein the second depth map includes a second set of coordinates that represent a second set of respective physical locations in the second camera field of view and that indicate a second set of respective depth values for the second set of respective physical locations, wherein the second set of respective depth values are relative to the second camera with which the communication interface is configured to communicate;

to identify a third set of coordinates of the first depth map that also represent the second set of respective physical locations, such that the third set of coordinates correspond to the second set of coordinates of the second depth map;

to identify one or more empty coordinates from the third set of coordinates, wherein each empty coordinate of the one or more empty coordinates is a coordinate of the first depth map that has no depth value assigned to the coordinate; and to update the first depth map by assigning to each empty coordinate of the one or more empty coordinates a respective depth value that is based on a depth value of a corresponding coordinate of the second set of coordinates of the second depth map, wherein the corresponding coordinate for the empty coordinate is a coordinate of the second set of coordinates of the second depth map that represents a same physical location as the empty coordinate.

15. The non-transitory computer-readable medium of claim 14, wherein when the first depth map has a first resolution higher than a second resolution of the second depth map, the instructions further cause the control circuit:

to identify, for at least one coordinate that belonged or belongs to the one or more empty coordinates, a respective set of one or more adjacent empty coordinates of the first depth map which are adjacent to the at least one coordinate and which have no assigned depth values; and to assign to the respective set of one or more adjacent empty coordinates a depth value that was assigned or is to be assigned to the at least one coordinate.

16. The non-transitory computer-readable medium of claim 15, wherein the instructions cause the control circuit to identify the respective set of one or more adjacent empty coordinates as all empty coordinates in a region of coordinates surrounding the at least one coordinate, wherein the control circuit is configured to determine a size of the region based on a ratio between a resolution of the first depth map and a resolution of the second depth map.

17. The non-transitory computer-readable medium of claim 14, wherein the instructions further cause the control circuit to perform the following for each coordinate that belonged or belongs to the one or more empty coordinates:
determining a respective center location of the coordinate;
determining, a 3D coordinate that projects onto the center location of the coordinate and for which a component of the 3D coordinate is equal to a depth value assigned or to be assigned to the coordinate; and
generating a point cloud based on the respective 3D coordinate.

18. A method of updating one or more depth maps, comprising:
receiving a first depth map by a control circuit of a camera image processing system, wherein the first depth map is received from a non-transitory computer-readable medium of the camera image processing system, or via a communication interface of the camera image processing system, wherein the communication interface is configured to communicate with a first camera that has a first camera field of view, and wherein the first depth map is generated based on information sensed by the first camera with which the communication interface is configured to communicate, wherein the first depth map includes a first set of coordinates that represent a first set of respective physical locations in the first camera field of view and that indicate a first set of respective depth values for the first set of respective physical locations, wherein the first set of respective depth values are relative to the first camera with which the communication interface is configured to communicate;
receiving a second depth map, wherein the second depth map is received from the non-transitory computer-readable medium of the camera image processing system, or via the communication interface of the camera image processing system, wherein the communication interface is configured to communicate with a second camera that has a second camera field of view which overlaps with the first camera field of view, wherein the second depth map is generated based on information sensed by the second camera with which the communication interface is configured to communicate, wherein the second depth map includes a second set of coordinates that represent a second set of respective physical locations in the second camera field of view and that indicate a second set of respective depth values for the second set of respective physical locations, wherein the second set of respective depth values are relative to the second camera with which the communication interface is configured to communicate;
identifying a third set of coordinates of the first depth map that also represent the second set of respective physical locations, such that the third set of coordinates correspond to the second set of coordinates of the second depth map;
identifying one or more empty coordinates from the third set of coordinates, wherein each empty coordinate of the one or more empty coordinates is a coordinate of the first depth map that has no depth value assigned to the coordinate; and
updating the first depth map by assigning to each empty coordinate of the one or more empty coordinates a respective depth value that is based on a depth value of a corresponding coordinate of the second set of coordinates of the second depth map, wherein the corresponding coordinate for the empty coordinate is a coordinate of the second set of coordinates of the second depth map that represents a same physical location as the empty coordinate.

19. The method of claim 18, further comprising, when the first depth map has a first resolution higher than a second resolution of the second depth map:
identifying, for at least one coordinate that belonged or belongs to the one or more empty coordinates, a respective set of one or more adjacent empty coordinates of the first depth map which are adjacent to the at least one coordinate and which have no assigned depth values; and
assigning to the respective set of one or more adjacent empty coordinates a depth value that was assigned or is to be assigned to the at least one coordinate.

20. The method of claim 19, further comprising:
identifying the respective set of one or more adjacent empty coordinates as all empty coordinates in a region of coordinates surrounding the at least one coordinate, wherein the control circuit is configured to determine a size of the region based on a ratio between a resolution of the first depth map and a resolution of the second depth map.

* * * * *